(12) United States Patent
Oh

(10) Patent No.: US 12,495,211 B2
(45) Date of Patent: Dec. 9, 2025

(54) SENSOR DRIVING DEVICE CAPABLE OF RELATIVE MOVEMENTS WITH RESPECT TO A LENS BARREL

(71) Applicant: LG INNOTEK CO., LTD., Seoul (KR)

(72) Inventor: Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 212 days.

(21) Appl. No.: 18/259,314

(22) PCT Filed: Dec. 24, 2021

(86) PCT No.: PCT/KR2021/019869
§ 371 (c)(1),
(2) Date: Jun. 26, 2023

(87) PCT Pub. No.: WO2022/139556
PCT Pub. Date: Jun. 30, 2022

(65) Prior Publication Data
US 2024/0064404 A1  Feb. 22, 2024

(30) Foreign Application Priority Data
Dec. 24, 2020  (KR) .......................... 10-2020-0183539

(51) Int. Cl.
*H04N 23/68*  (2023.01)
*G03B 5/04*  (2021.01)
(Continued)

(52) U.S. Cl.
CPC ............. *H04N 23/687* (2023.01); *G03B 5/04* (2013.01); *H02K 41/0356* (2013.01);
(Continued)

(58) Field of Classification Search
CPC ........ H04N 23/687; H04N 23/54; G03B 5/04; G03B 2205/0015; G03B 2205/0069;
(Continued)

(56) References Cited

U.S. PATENT DOCUMENTS 12,132,065 B2   10/2024   Park et al.
2016/0142636 A1*  5/2016   Kim ..................... H04N 23/68
                                                      348/208.11
(Continued)

FOREIGN PATENT DOCUMENTS

JP   2019512734 A    5/2019
JP   2020170170 A   10/2020
(Continued)

OTHER PUBLICATIONS

Supplementary European Search Report dated Sep. 27, 2024 in European Application No. 21911621.7.
(Continued)

*Primary Examiner* — Gevell V Selby
(74) *Attorney, Agent, or Firm* — Saliwanchik, Lloyd & Eisenschenk

(57) ABSTRACT

A sensor driving device according to an embodiment includes a fixed part; a moving part spaced apart from the fixed part; and a wire part disposed between the fixed part and the moving part, wherein the fixed part includes a first substrate including a first lead pattern part, wherein the moving part includes an elastic member including a second lead pattern part and a sensor disposed on the elastic member, wherein the second lead pattern part includes: a second-first lead pattern part connected to the sensor; a second-second lead pattern part connected to the wire part; and a connection pattern part elastically connecting between the second-first lead pattern part and the second-second lead pattern part; and wherein the wire part has one end connected to the first lead pattern part and the other end connected to the second-second lead pattern part to elastically support the moving part.

20 Claims, 24 Drawing Sheets

(51) Int. Cl.
*H02K 41/035* (2006.01)
*H04N 23/54* (2023.01)

(52) U.S. Cl.
CPC ..... *H04N 23/54* (2023.01); *G03B 2205/0015* (2013.01); *G03B 2205/0069* (2013.01)

(58) Field of Classification Search
CPC .. G03B 2205/0038; G03B 3/10; G03B 30/00; G03B 5/00; G03B 2205/0007; H02K 41/0356

See application file for complete search history.

(56) References Cited

U.S. PATENT DOCUMENTS

| | | | |
|---|---|---|---|
| 2018/0171991 A1 | 6/2018 | Miller et al. | |
| 2019/0020822 A1 | 1/2019 | Sharma et al. | |
| 2019/0141248 A1* | 5/2019 | Hubert | G03B 5/00 |
| 2020/0336639 A1* | 10/2020 | Hu | H04N 23/55 |
| 2021/0227142 A1 | 7/2021 | Sharma et al. | |
| 2022/0014654 A1* | 1/2022 | Park | H04N 23/57 |
| 2022/0102417 A1 | 3/2022 | Park et al. | |
| 2022/0337753 A1 | 10/2022 | Oh | |

FOREIGN PATENT DOCUMENTS

| | | |
|---|---|---|
| KR | 10-20190097113 A | 8/2019 |
| KR | 10-20200086035 A | 7/2020 |
| KR | 10-20200097086 A | 8/2020 |
| KR | 10-20200106312 A | 9/2020 |
| KR | 10-20210026659 A | 3/2021 |
| WO | 2020/162688 A1 | 8/2020 |
| WO | 2020/198653 A1 | 10/2020 |

OTHER PUBLICATIONS

International Search Report dated Apr. 22, 2022 in International Application No. PCT/KR2021/019869.

* cited by examiner (a)

(b)

(a)

(b)

(a)

(b)

(a)

(b)

SENSOR DRIVING DEVICE CAPABLE OF RELATIVE MOVEMENTS WITH RESPECT TO A LENS BARREL

CROSS-REFERENCE TO RELATED APPLICATIONS

This application is the U.S. national stage application of International Patent Application No. PCT/KR2021/019869, filed Dec. 24, 2021, which claims the benefit under 35 U.S.C. § 119 of Korean Application No. 10-2020-0183539, filed Dec. 24, 2020, the disclosures of each of which are incorporated herein by reference in their entirety.

TECHNICAL FIELD

An embodiment relates to a sensor driving device, and more particularly, to a sensor driving device capable of relative movement with respect to a lens barrel.

BACKGROUND ART

In general, a camera device is mounted in an automobile, an endoscope, and an electronic device such as a CCTV, in addition to a portable device such as a mobile communication terminal and an MP3 player. Such a camera device has been gradually developed with a focus on high pixels, and has been reduced in size and thickness. Not only that, current camera devices are changing so that a variety of additional functions can be realized at low production costs.

The above-described camera device includes a lens barrel for accommodating a lens, a lens holder coupled with the lens barrel, an image sensor disposed in the lens holder, and a driving substrate on which the image sensor is mounted. In this case, the lens transmits an image signal of a subject to the image sensor. Then, the image sensor converts the video signal into an electric signal.

Here, accuracy of the video signal at the camera device is determined according to a focal length defined as a distance between the lens and the image sensor.

Accordingly, the camera device provided focus correction or shake compensation by moving the lens barrel relative to the image sensor. That is, in the camera device, the lens barrel accommodating the lens was moved relative to the image sensor in an X-axis, a Y-axis, and a Z-axis. At this time, the camera device required at least six elastic members such as springs to relatively move the lens barrel. In addition, each elastic member was coupled with the lens barrel by a method like bonding.

However, the camera device according to the related art as described above is composed of an upper spring plate disposed above the lens barrel, a lower spring plate disposed below the lens barrel, and a structure such as an elastic wire for fixing the Z-axis due to relative movement of the lens barrel, and thus there is a problem that the module structure of the camera device is complicated.

In addition, the camera device according to the related art requires a plurality of elastic members for moving the lens barrel, and thus there is a problem that the number of assembly processes for the plurality of elastic members increases.

DISCLOSURE

Technical Problem

The embodiment provides a sensor driving device having a new structure.

In addition, the embodiment provides a sensor driving device that allows the image sensor to move relative to the lens barrel.

In addition, the embodiment provides a sensor driving device that enables not only movement of the X-axis, Y-axis, and Z-axis, but also tilt correction of the image sensor in order to provide AF and OIS functions.

In addition, the embodiment provides a sensor driving device capable of simplifying a spring structure for providing an auto-focus function or a hand-shake correction function.

In addition, the embodiment provides a sensor driving device capable of inhibiting a tilt phenomenon occurring when an image sensor is moved.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A sensor driving device according to an embodiment includes a fixed part; a moving part spaced apart from the fixed part; and a wire part disposed between the fixed part and the moving part, wherein the fixed part includes a first substrate including a first lead pattern part, wherein the moving part includes an elastic member including a second lead pattern part and a sensor disposed on the elastic member, wherein the second lead pattern part includes: a second-first lead pattern part connected to the sensor; a second-second lead pattern part connected to the wire part; and a connection pattern part elastically connecting between the second-first lead pattern part and the second-second lead pattern part; and wherein the wire part has one end connected to the first lead pattern part and the other end connected to the second-second lead pattern part to elastically support the moving part.

In addition, the elastic member includes an insulating part including a first insulating part and a second insulating part spaced apart from the first insulating part; wherein the second-first lead pattern part is disposed on the first insulating part, wherein the second-second lead pattern part is disposed on the second insulating part, and wherein the connection pattern part elastically connects between the first insulating part and the second insulating part.

In addition, the fixed part includes a first coil part disposed on the first substrate.

In addition, the moving part includes a magnet holder having an opening formed in a central region, and a magnet part disposed on the magnet holder and corresponding to the first coil part.

In addition, the moving part includes a coil holder having an opening formed in a central region and disposed in the opening of the magnet holder, and a second coil part disposed on the coil holder and corresponding to the magnet part.

In addition, the first coil part is disposed on a lower surface of the first substrate to face an upper surface of the magnet part, and wherein the second coil part is disposed on an outer surface of the coil holder to face an inner surface of the magnet part.

In addition, the wire part includes a plurality of wires, wherein at least one of the plurality of wires is electrically connected to the second coil part.

In addition, the moving part includes a sensor substrate disposed in the opening of the coil holder, on which the sensor is mounted and a terminal part connected to the second-first lead pattern part is formed.

In addition, the second lead pattern part includes a plurality of elastic connection lines, wherein at least one second-first lead pattern part of the plurality of elastic connection lines is disposed on a first side region of the first insulating part, and wherein a second-second lead pattern part connected to the second-first lead pattern part disposed on the first side region is disposed on a second side region of the second insulating part that does not correspond to the first side region.

In addition, the connection pattern part is bent at least twice.

In addition, the second-second lead pattern part includes a body part; a coupling part coupled to the other end of the wire part; and a connection part connecting the body part and the coupling part.

In addition, the connection part of the second-second lead pattern part includes a bent region.

In addition, the first lead pattern part includes a plurality of first lead patterns, wherein the second lead pattern part includes a plurality of second lead patterns, wherein the wire part includes a plurality of wires, and wherein a number of the plurality of wires is equal to or less than a number of each of the plurality of first lead patterns and the plurality of second lead patterns.

On the other hand, a sensor driving device according to the embodiment includes a first substrate; an elastic member disposed to be spaced apart from the first substrate; a wire part connecting the first substrate and the elastic member; an image sensor module disposed on the elastic member and having a sensor mounted thereon; a first driving part disposed on the first substrate; a first holder disposed on the elastic member and including an opening in which the image sensor module is disposed; a second holder disposed on the elastic member and including an opening in which the first holder is disposed; a second driving part disposed on the first holder; and a third driving part disposed on the second holder, wherein the elastic member includes a plurality of elastic connection lines, wherein at least one of the plurality of elastic connection lines electrically connects the first substrate and the image sensor module through the wire part, and wherein the sensor moves in a direction perpendicular to an optical axis by the first driving part and the third driving part, and moves in the optical axis direction by the second driving part and the third driving part.

In addition, the first driving part includes a plurality of first coils, wherein the second driving part includes a second coil, and wherein the third driving part includes a plurality of magnets facing the plurality of first coils and the second coil.

Advantageous Effects

According to an embodiment, the image sensor is moved and rotated respect to the lens barrel in the X-axis, Y-axis and Z-axis directions in order to implement the OIS and AF functions of the camera module instead of moving the lens barrel in the prior art. Accordingly, the camera module according to the embodiment can eliminate the complex spring structure for implementing the OIS and AF functions, and accordingly, the structure may be simplified. In addition, the embodiment may provide a more stable structure compared to the prior art, by moving the image sensor relative to the lens barrel.

In addition, the camera module according to the embodiment includes a lead pattern part electrically connected to the image sensor. The lead pattern part has a spring structure. In addition, the lead pattern part is disposed to float in a position that does not overlap with an insulating layer in a vertical direction. Accordingly, the camera module may stably and elastically support the image sensor. Also, the camera module may stably move the image sensor with respect to the lens barrel.

In addition, the X-axis direction shift, Y-axis direction shift, Z-axis direction shift, and Z-axis rotation of the image sensor in the camera module according to the embodiment may be performed for a handshake correction function. Furthermore, the camera module according to the embodiment may provide a handshake correction function through movement of the lens along with movement of the image sensor. Accordingly, the embodiment may provide a more improved handshake correction function.

In addition, the actuator for moving the image sensor relative to the lens barrel in the camera module in the embodiment includes an inner space. In addition, a gyro sensor, a driver IC, etc., which are electrical elements necessary for a camera circuit, may be built in the inner space of the actuator. Accordingly, the embodiment may reduce the overall height of the camera module.

In addition, the camera assembly process according to the embodiment can be simplified by integrating and fusing the camera circuit component and the actuator component.

In addition, the embodiment may enable easy replacement of the lens module.

That is, an OIS function or an AF function in the camera device in the comparative example should be provided in the lens module. Accordingly, when the lens module in the comparative example is replaced, the actuator must also be replaced. In addition, the AF function or the OIS function could not be provided in the case of replacing the lens module without an actuator for the AF function or the OIS function in the comparative example.

On the other hand, both the AF function and the OIS function in the embodiment can be implemented through the movement of the image sensor. Accordingly, when the lens module in the embodiment is replaced, it is possible to easily replace the lens module with a lens module not equipped with an OIS function, thereby improving user satisfaction.

DETAILED DESCRIPTION OF THE EMBODIMENTS

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (a), and (b) may be used.

These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Hereinafter, embodiments of the present disclosure will be described in detail with reference to the accompanying drawings.

Figure 1:
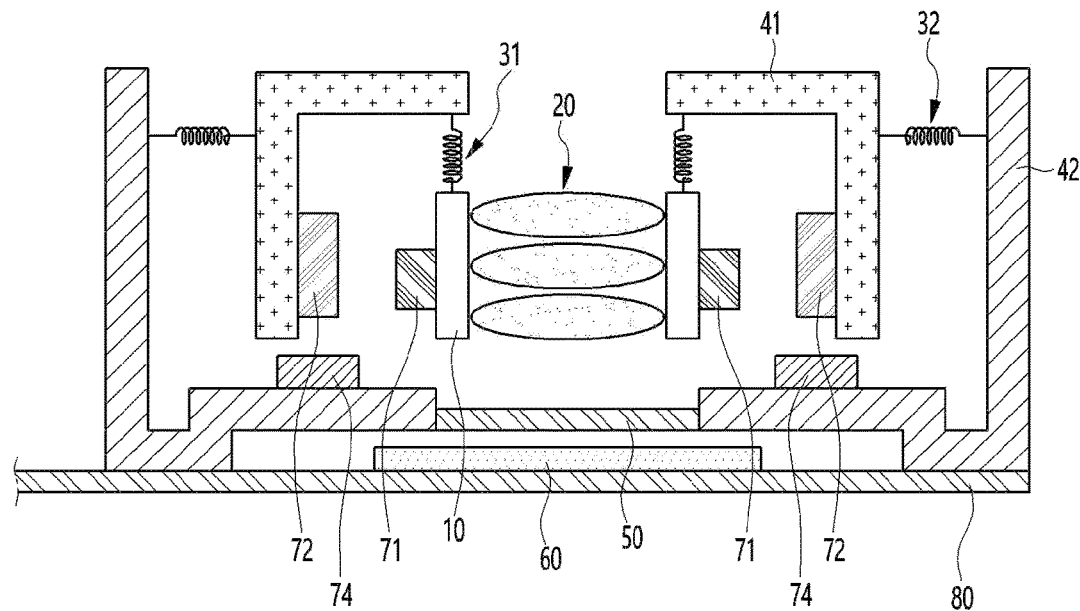
FIG. 1 is a view showing a camera module according to a comparative example.

FIG. 1 is a view showing a camera module according to a comparative example.

A camera module having an optical image stabilizer (OIS) function and an Auto Focusing (AF) function requires at least two spring plates.

The camera module according to the comparative example may have two spring plates. The camera module according to the comparative example requires an elastic member such as at least six springs for the spring plate.

Referring to FIG. 1, the camera module according to the comparative example includes an optical system including a lens assembly, an infrared cut-off filter, and a sensor unit. That is, the camera module according to the comparative example includes a lens barrel 10, a lens assembly 20, a first elastic member 31, a second elastic member 32, a first housing 41, a housing 42, an infrared cut-off filter 50, a sensor unit 60, a circuit board 80, and drivers 71, 72, 73, and 74.

In this case, the lens barrel 10 is connected to the first housing 41. That is, the lens barrel 10 is connected to the first housing 41 via the first elastic member 31. That is, the lens barrel 10 is connected to the first housing 41 so as to be movable by the first elastic member 31. In this case, the first elastic member 31 includes a plurality of springs (not shown). For example, the first elastic member 31 connects between the lens barrel 10 and the first housing 41 at a plurality of points of the lens barrel 10.

The second elastic member 32 is connected to the first housing 41 and the second housing 42 accommodating the first housing 41. The second elastic member 32 fixes the first housing 41 to the second housing 42 so as to be movable. The second elastic member 32 includes a plurality of springs. In detail, the second elastic member 32 includes a plate-shaped spring.

In this case, the first elastic member 31 moves the lens barrel 10 relative to the sensor unit 60 in a vertical direction (a Z-axis direction) while supporting the lens barrel 10. To this end, the first elastic member 31 includes at least four springs.

In addition, the second elastic member 32 moves the lens barrel 10 relative to the sensor unit 60 in a horizontal direction (an X-axis direction and a Y-axis direction) while supporting the lens barrel 10. To this end, the second elastic member 32 includes at least two springs.

As described above, OIS and AF in the camera module according to the comparative example are performed as the lens barrel 10 moves in the X-axis, Y-axis, and Z-axis directions. To this end, the camera module according to the comparative example requires at least six elastic members such as springs. In addition, the camera module according to the comparative example requires two spring plates for supporting the elastic member as described above. Further, the camera module according to the comparative example requires an additional member such as an elastic wire for fixing the Z-axis of the lens barrel 10. Therefore, the camera module according to the comparative example has a complicated spring structure for moving the lens barrel in the X-axis, Y-axis and Z-axis directions.

In addition, in the camera module according to the comparative example, it is necessary to manually perform an operation of bonding the respective elastic members in order to couple the elastic member with the lens barrel 10. Accordingly, the camera module according to the comparative example has a complicated manufacturing process and requires a long manufacturing time.

In addition, the camera module according to the comparative example provides a tilt function of the lens barrel 10, but has a structure in which tilt correction of an image is substantially difficult. That is, even though the lens barrel 10 rotates with respect to the sensor unit 60, an image incident on the sensor unit 60 does not change, and thus the tilt correction of the image is difficult, and further, the tilt function itself is unnecessary.

Hereinafter, a substrate for an image sensor, a camera module, and a camera device including the same according to an embodiment will be described.

An 'optical axis direction' used below is defined as an optical axis direction of a lens and/or an image sensor coupled to a lens driving device.

A 'vertical direction' used below may be a direction parallel to the optical axis direction. The vertical direction may correspond to a 'z-axis direction'. A 'horizontal direction' used below may be a direction perpendicular to the vertical direction. That is, the horizontal direction may be a direction perpendicular to the optical axis. Accordingly, the horizontal direction may include a 'x-axis direction' and a 'y-axis direction'.

An 'autofocus function' used below adjusts the distance from the image sensor by moving the lens in the optical axis direction according to the distance of the subject so that a clear image of the subject can be obtained by the image sensor, and accordingly, it is defined as a function that automatically focuses on the subject. Meanwhile, 'auto focus' may correspond to 'AF (Auto Focus)'.

The 'shake correction function' used below is defined as a function of moving a lens and/or an image sensor to offset vibration (movement) generated in the image sensor by an external force. Meanwhile, 'hand shake correction' may correspond to 'OIS (Optical Image Stabilization)'.

Figure 2:
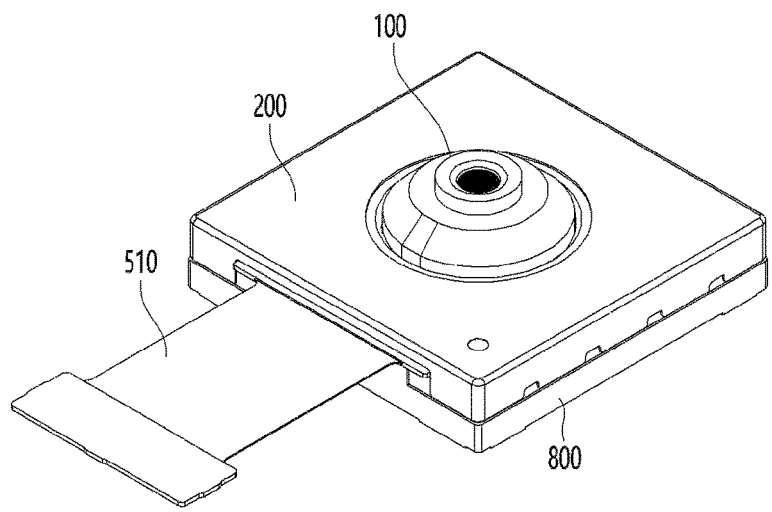
FIG. 2 is a perspective view of a camera device according to an embodiment.
Figure 3:
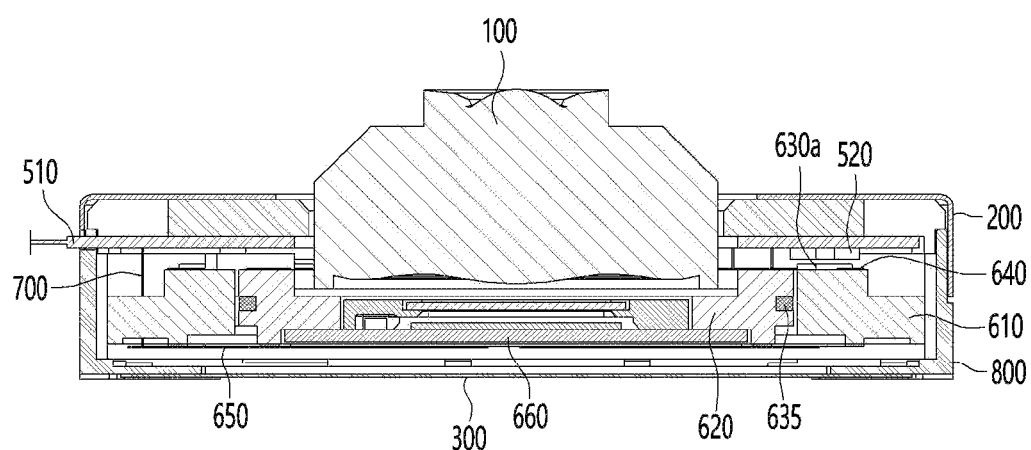
FIG. 3 is a cross-sectional view taken along line A-A of FIG. 2.
Figure 4:
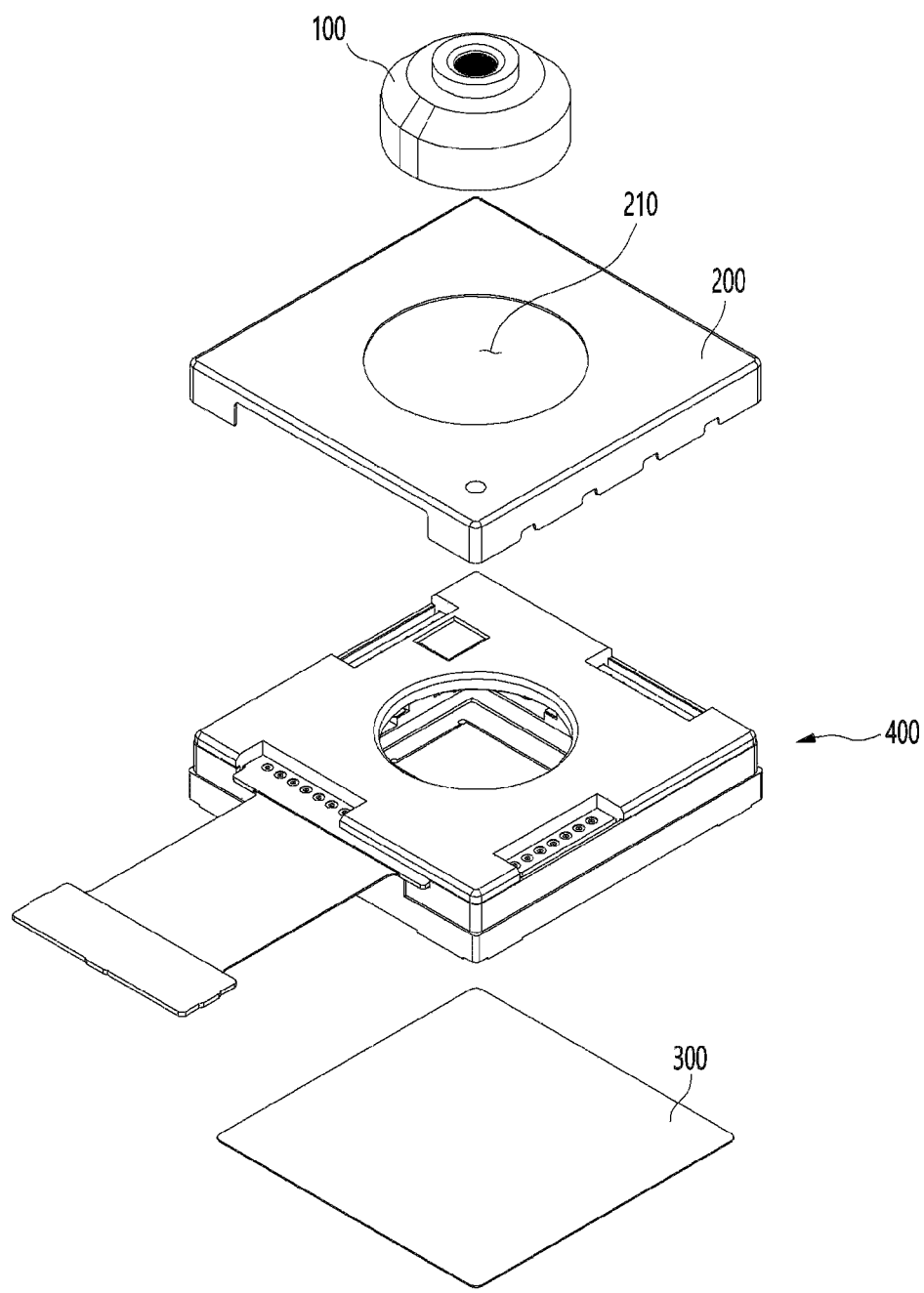
FIG. 4 is an exploded perspective view of the camera device according to the embodiment.

FIG. 2 is a perspective view of a camera device according to an embodiment, FIG. 3 is a cross-sectional view taken along line A-A of FIG. 2, and FIG. 4 is an exploded perspective view of the camera device according to the embodiment.

A camera device in the embodiment may include a camera module. The camera device may include a lens driving device. Here, the lens driving device may be a voice coil motor (VCM, Voice Coil Motor). The lens driving device may be a lens driving motor. The lens driving device may be a lens driving actuator. The lens driving device may include an AF module. The lens driving device may include an OIS module.

<Camera Device>

The camera device may include the lens module 100.

The lens module 100 may include a lens and a lens barrel. The lens module 100 may include one or more lenses and a lens barrel capable of receiving one or more lenses.

However, one configuration of the lens module 100 is not limited to the lens barrel, and any holder structure capable of supporting one or more lenses may be used.

The lens module 100 maintains a fixed position without moving in the embodiment. That is, the lens module in a general camera device is tilted in the optical axis direction or in a direction perpendicular to the optical axis for AF or OIS. Specifically, the lens module in the camera device of the comparative example is tilted or moved by the actuator. That is, the AF function or the OIS function in the camera device of the comparative example is implemented by the movement of the lens module.

On the other hand, both the OIS function and the AF function in the embodiment can be provided by moving (tilting or shifting) an image sensor module 660 in a state in which the position of the lens module 100 is fixed.

The camera device may include an actuator.

Specifically, the camera device may include an actuator 400 for shifting the image sensor module 660. The actuator 400 may be an AF module. Also, the actuator 400 may be an OIS module. The actuator 400 may move the image sensor module 660 in the vertical direction (clearly, the optical axis direction) while the lens module 100 is fixed. That is, the actuator 400 may perform an autofocus function by moving the image sensor module 660 in the optical axis direction. Also, the actuator 400 may tilt or rotate the image sensor module 660.

That is, the actuator 400 moves the image sensor module 660 in a first direction perpendicular to the optical axis. Also, the actuator 400 moves the image sensor module 660 in a second direction perpendicular to the optical axis and the first direction. Also, the actuator 400 may rotate the image sensor module 660 about the optical axis. In this case, the first direction may be an x-axis direction, the second direction may be a y-axis direction, and the optical axis may be a z-axis direction.

Meanwhile, the actuator 400 may include a driving part for moving the image sensor module 660. That is, specifically, the actuator 400 may include first to third driving parts. In this case, two driving parts among the first to third driving parts may be first and second coils. In addition, the remaining one driving part among the first to third driving parts may be a magnet. In this case, the magnet may be a common magnet. That is, electromagnetic force is generated in the first coil and the common magnet, so that the image sensor module 660 can be moved. In addition, electromagnetic force is generated by the second coil and the common magnet, so that the image sensor module 660 can be moved.

The camera device may include a case.

The case may include a first case 200 and a second case 300. The first case 200 may be an upper case that covers an upper region of the camera device. In this case, the first case 200 may be a shield can.

The first case 200 may be disposed to surround side portions of the lens module 100, the actuator 400 and the image sensor module 660 constituting the camera device. The first case 200 may have a first open region 210 formed on its upper surface. The first open region 210 of the first case 200 may be a hollow hole. The lens module 100 may be disposed in the first open region 210 of the first case 200. In this case, the first open region 210 of the first case 200 may have a larger diameter than that of the lens module 100.

Specifically, the first case 200 may include an upper plate. In addition, the first case may include a plurality of side plates that are curved or bent at the edge of the upper plate and extend downward. For example, the upper plate of the first case 200 may have a rectangular shape. Accordingly, the first case 200 may include four side plates extending downward from four edges of the upper plate. For example, the first case 200 may have a rectangular parallelepiped shape in which having the first region 210 in which the lens module 100 is inserted is formed on the upper surface thereof, the lower surface is open, and the corners are rounded.

Meanwhile, a second open region (not shown) may be formed on any one of the four side plates of the first case 200. The second open region (not shown) may be an exposure hole for exposing a part of the actuator 400 disposed in the first case 200 to an outside. For example, the second open region (not shown) of the first case 200 may expose a terminal of the actuator 400.

The second case 300 may be a lower case that covers a lower region of the camera device. The second case 300 may close an open lower region of the first case 200.

The actuator 400 and the image sensor module 660 constituting the camera device may be disposed in a receiving space formed by the first case 200 and the second case 300.

The image sensor module 660 may be coupled to the actuator 400. Preferably, the actuator 400 may include a fixed part 500 and a moving part 600. In addition, the moving part 600 of the actuator 400 may be connected to the fixed part 500 through the wire 700. In addition, the moving part 600 of the actuator 400 may move relative to the fixed part by the electromagnetic force of the driving part. Here, the movement of the fixed part may include movement of the fixed part in the first direction, movement in the second direction, rotation about the optical axis direction, and movement in the optical axis direction.

In addition, the image sensor module 660 may be coupled to the moving part 600 of the actuator 400. The image sensor module 660 may include an image sensor 662. In addition, the image sensor 662 may be any one of a charge coupled device (CCD), a metal oxide semi-conductor (MOS), a CPD, and a CID.

In this embodiment, the image sensor 662 may be rotated about the x-axis, the y-axis, and the z-axis. The image sensor 662 may move with respect to the x-axis, the y-axis, and the z-axis. The image sensor 662 may be tilted with respect to the x-axis, the y-axis, and the z-axis.

That is, the image sensor module 660 is coupled to the moving part 600 of the actuator 400.

And, when the moving part of the second actuator 400 moves relative to the fixed part of the second actuator 400, the image sensor module 660 may move relative to the fixed part of the second actuator 400 together with the moving part of the second actuator 400. As a result, the hand-shake correction function may be performed.

As described above, the image sensor module 660 in the embodiment is moved using the actuator 400. In addition, both the AF function and the hand shake correction function may be performed by moving the image sensor module 660.

In the present embodiment, the camera device performs a handshake correction function and/or an autofocus function by moving the image sensor module 660 relative to the lens module 100.

That is, as camera technology develops in recent years, image resolution is increasing. In addition, the size of the image sensor 662 is also increased by this.

In this case, as the size of the image sensor 662 increases, the size of the lens module 100 and components of the actuator for moving the lens module 100 also increase. For this reason, as the weight of other actuator components for moving the lens module 100 increases as well as the own weight of the lens module 100, it is difficult to stably shift the lens module 100 using a VCM technology. Specifically, when the lens module 100 is moved using the VCL technology, many problems occur in terms of reliability.

Accordingly, AF and OIS in the present embodiment is performed using the actuator 400 implementing the image sensor shift method. Accordingly, the embodiment may improve the reliability of the camera device.

Furthermore, there are five handshakes in the camera device. For example, five handshakes include two handshakes that shake at an angle, two handshakes that shake with a shift, and one hand shake that shakes with rotation.

In this case, only the remaining four handshakes except for the hand shake shaking due to rotation among the five hand hakes can be corrected in the lens shift method (e.g., lens shift method). For example, it is impossible to correct for handshake shaken by rotation using the lens movement method. In this case, handshake caused by rotation can be corrected by rotating an optical module. However, even if the lens module 100 is rotated, the incident optical path is maintained as it is. Accordingly, only some of the five camera shake corrections are possible with the lens shift method.

Accordingly, all five handshake corrections in the embodiment are possible by applying the sensor shift method. That is, the embodiment enables to solve the reliability problem of the lens shift method that occurs according to the development of camera technology.

Hereinafter, each component of the camera device according to the embodiment will be described in more detail.

<Actuator>

Figure 5:
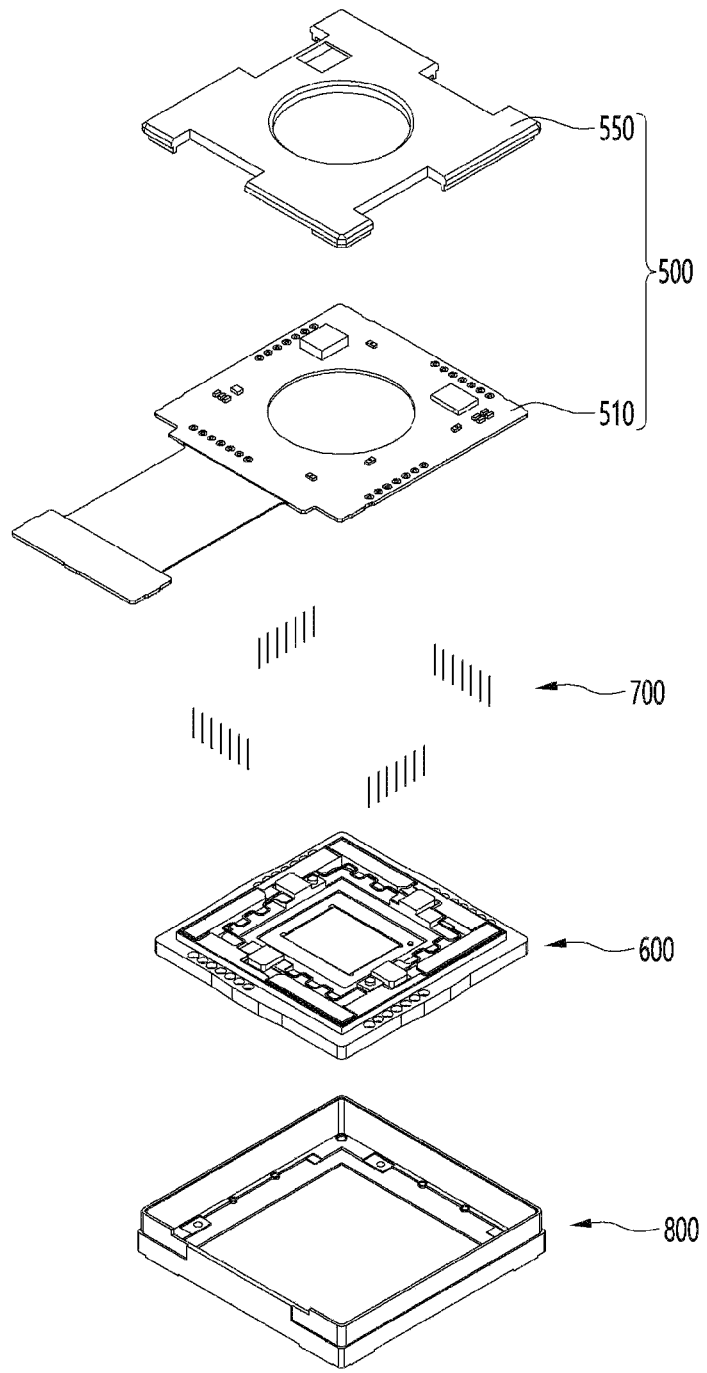
FIG. 5 is an exploded perspective view of an actuator shown in FIG. 4.
Figure 6:
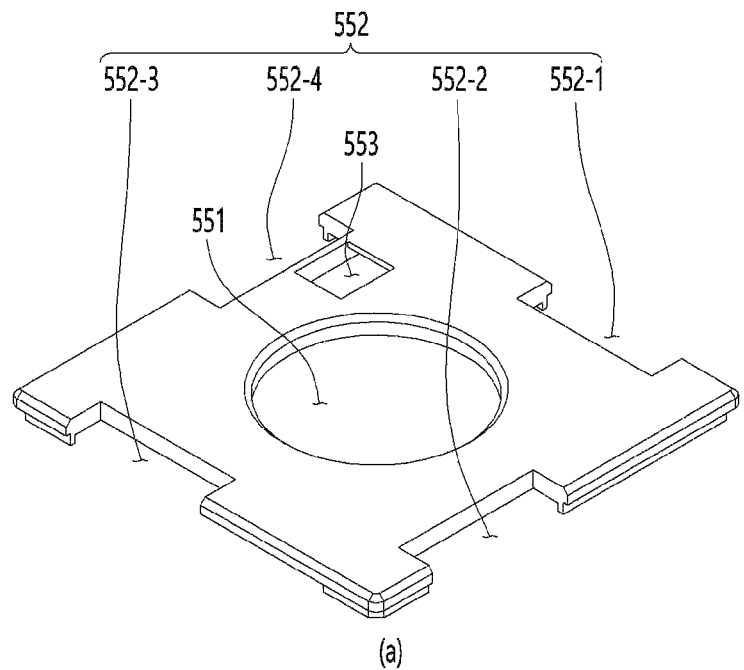
FIG. 6 is a perspective view of a first holder of a fixed part shown in FIG. 5.
Figure 6:
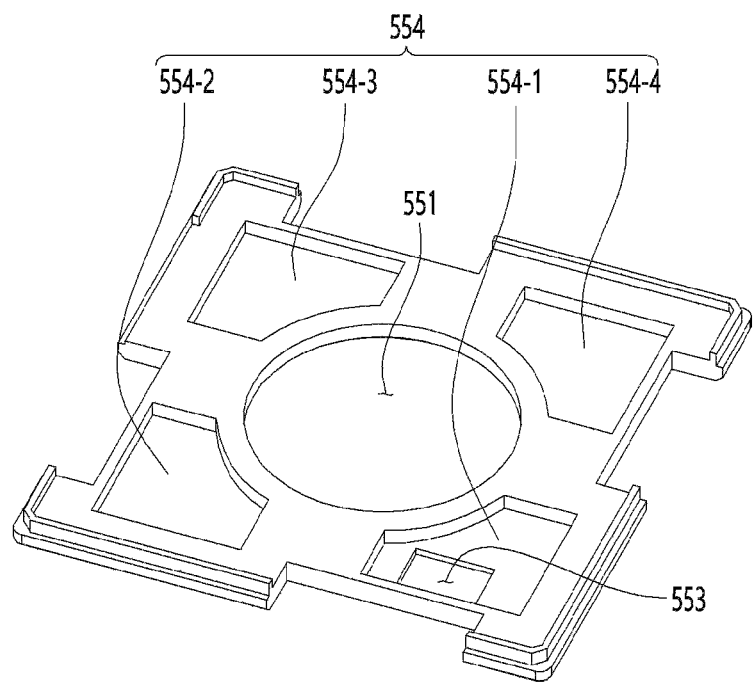
Figure 7:
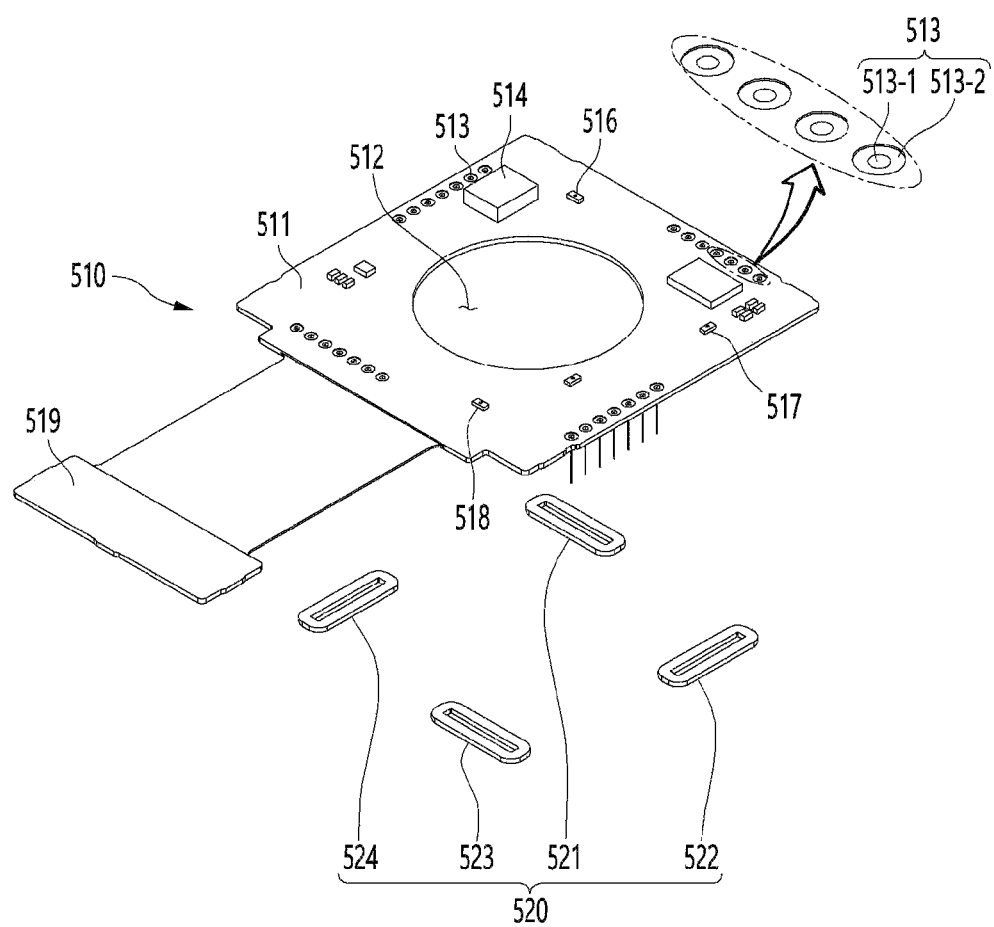
FIG. 7 is an exploded perspective view of a first substrate constituting a fixed part of the actuator shown in FIG. 5.
Figure 8:
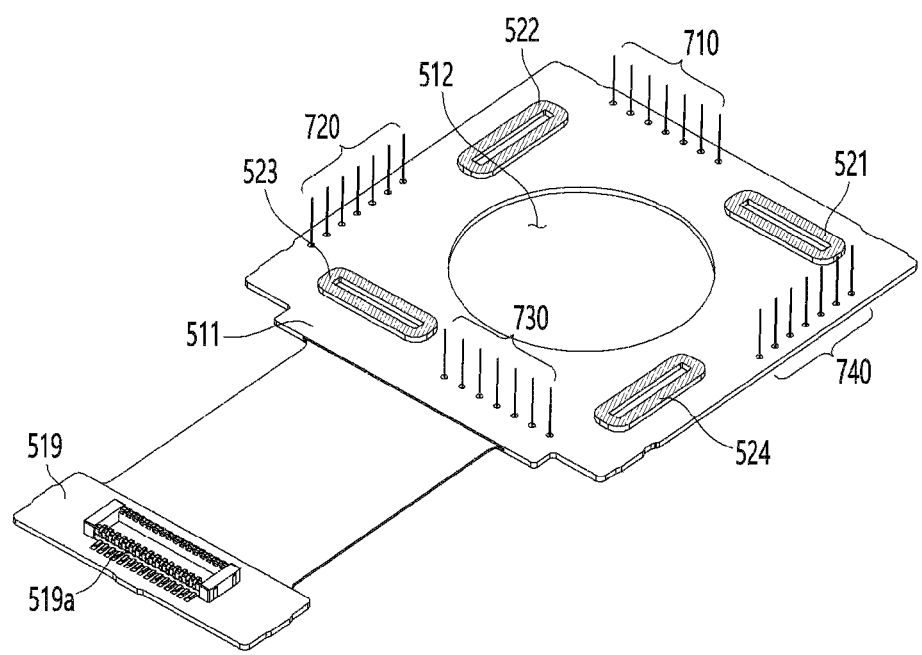
FIG. 8 is a view showing a coupling between the first substrate part and the wire part according to the embodiment.
Figure 9:
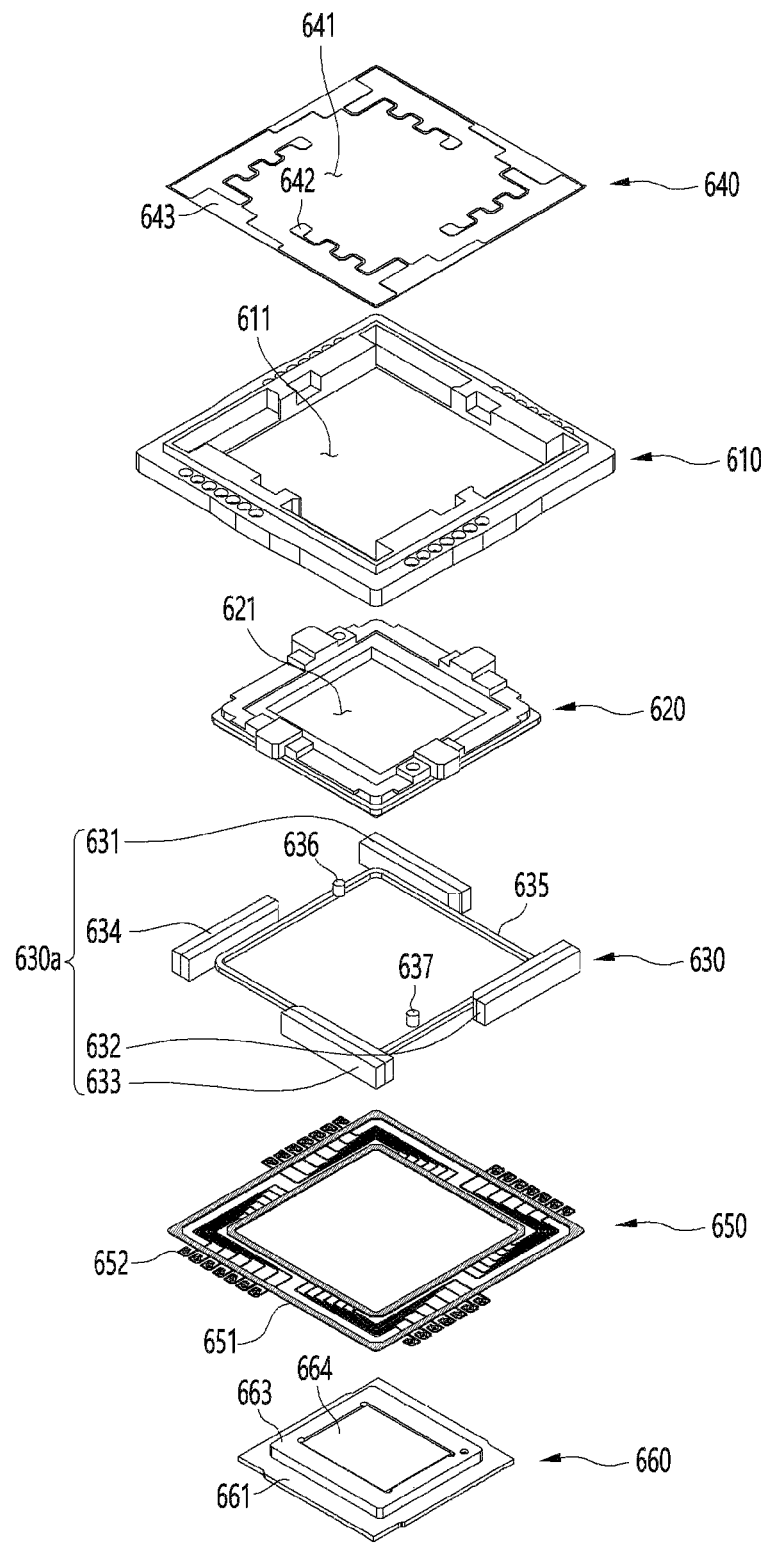
FIG. 9 is an exploded perspective view of a moving part of an actuator according to the embodiment.
Figure 10:
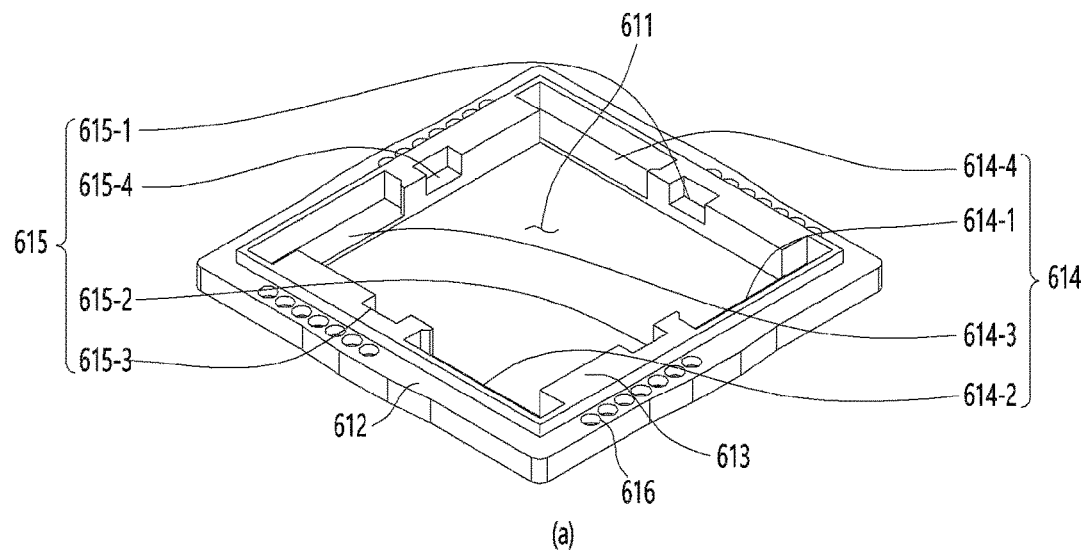
FIG. 10 is a perspective view of a second holder of the moving part according to the embodiment.
Figure 10:
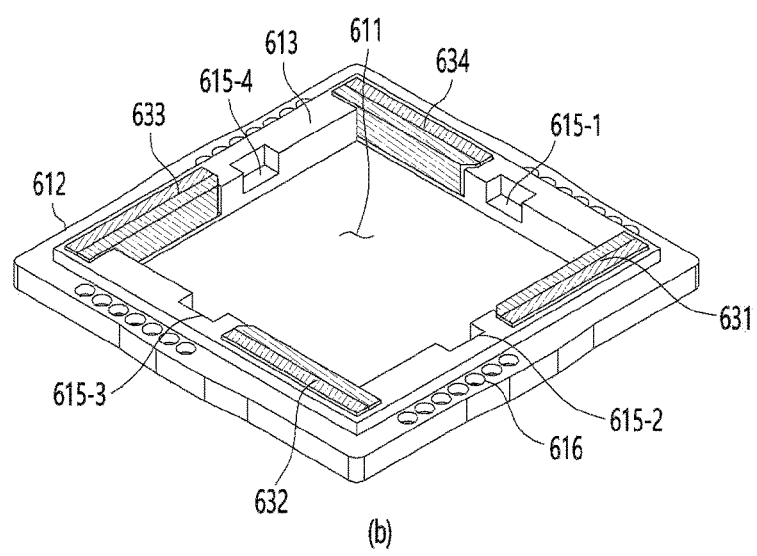
Figure 11:
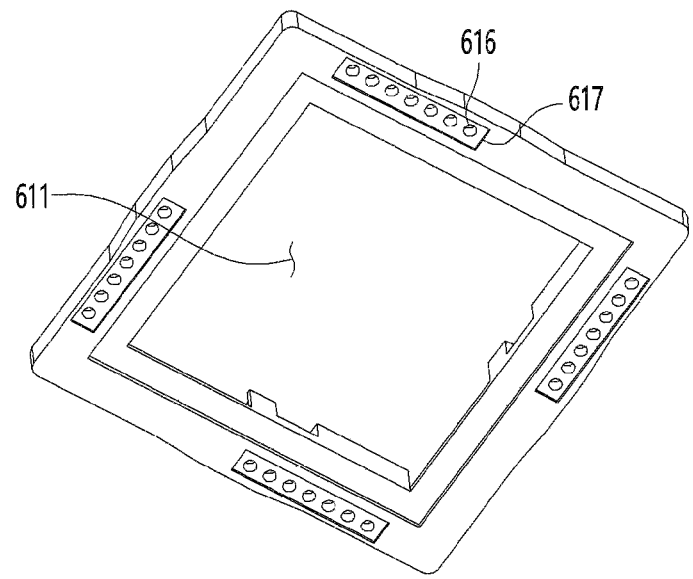
FIG. 11 is a view showing a coupling between a second holder and a second elastic member according to the embodiment.
Figure 11:
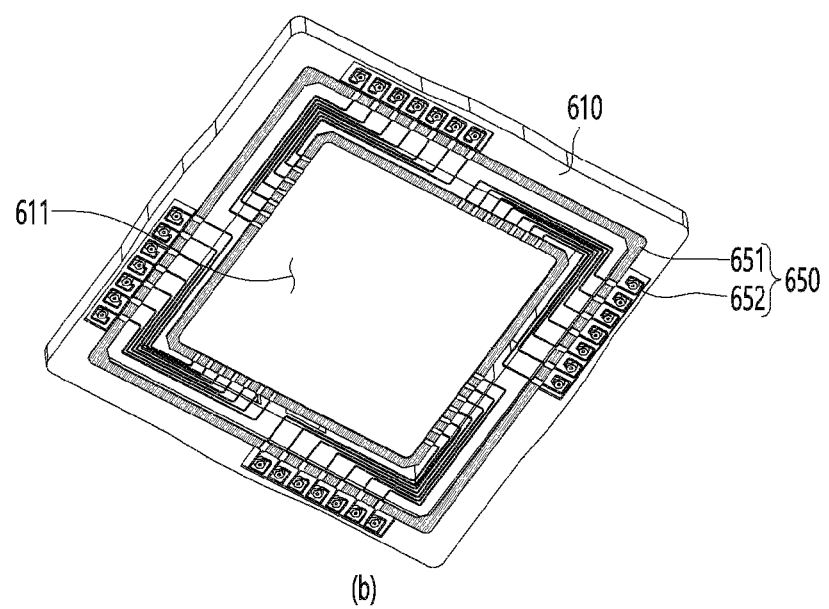
Figure 12A:
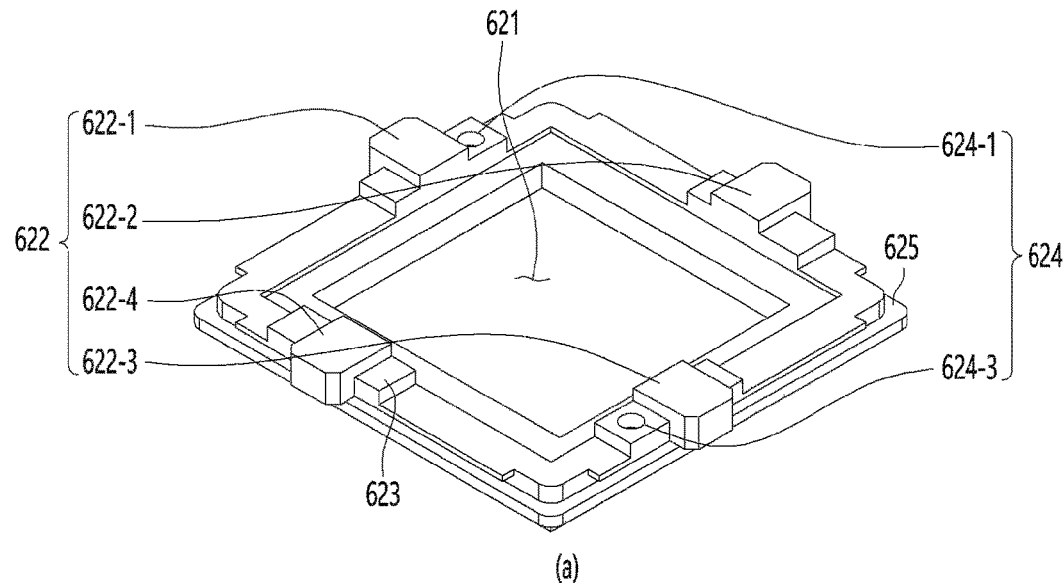
FIG. 12A is a perspective view of a third holder of the moving part according to the embodiment.
Figure 12B:
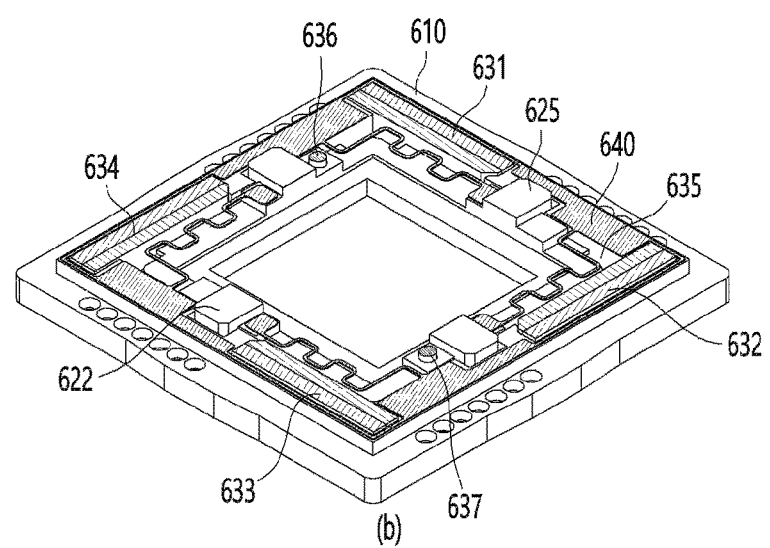
FIG. 12B is a view showing a coupling of a third holder, a first elastic member, a sensing magnet, a second coil part, and a magnet part according to the embodiment.
Figure 13:
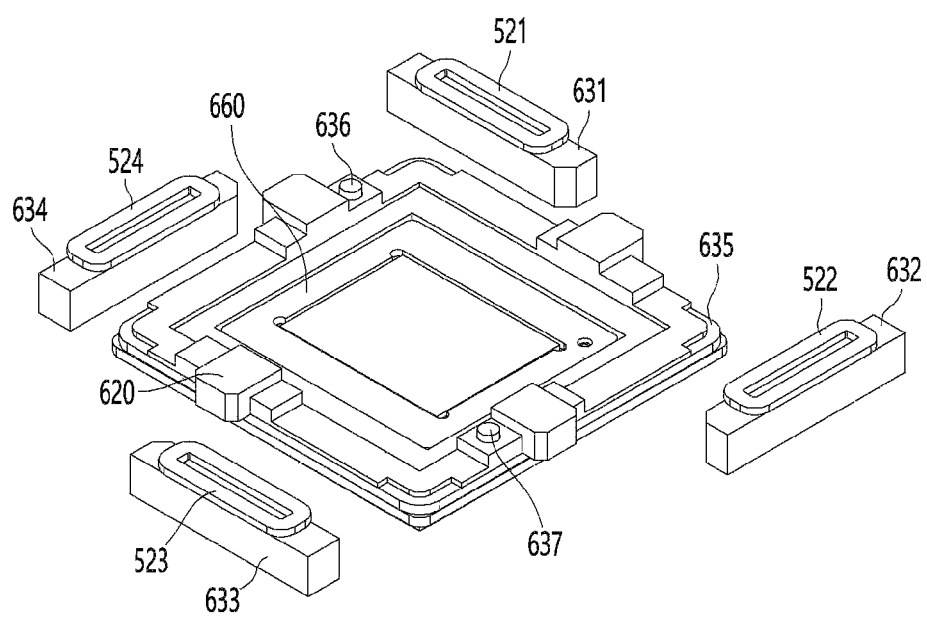
FIG. 13 is a view showing an arrangement relationship of a first coil part, a second coil part, and a magnet part constituting a driving part of the actuator according to the embodiment.
Figure 14:
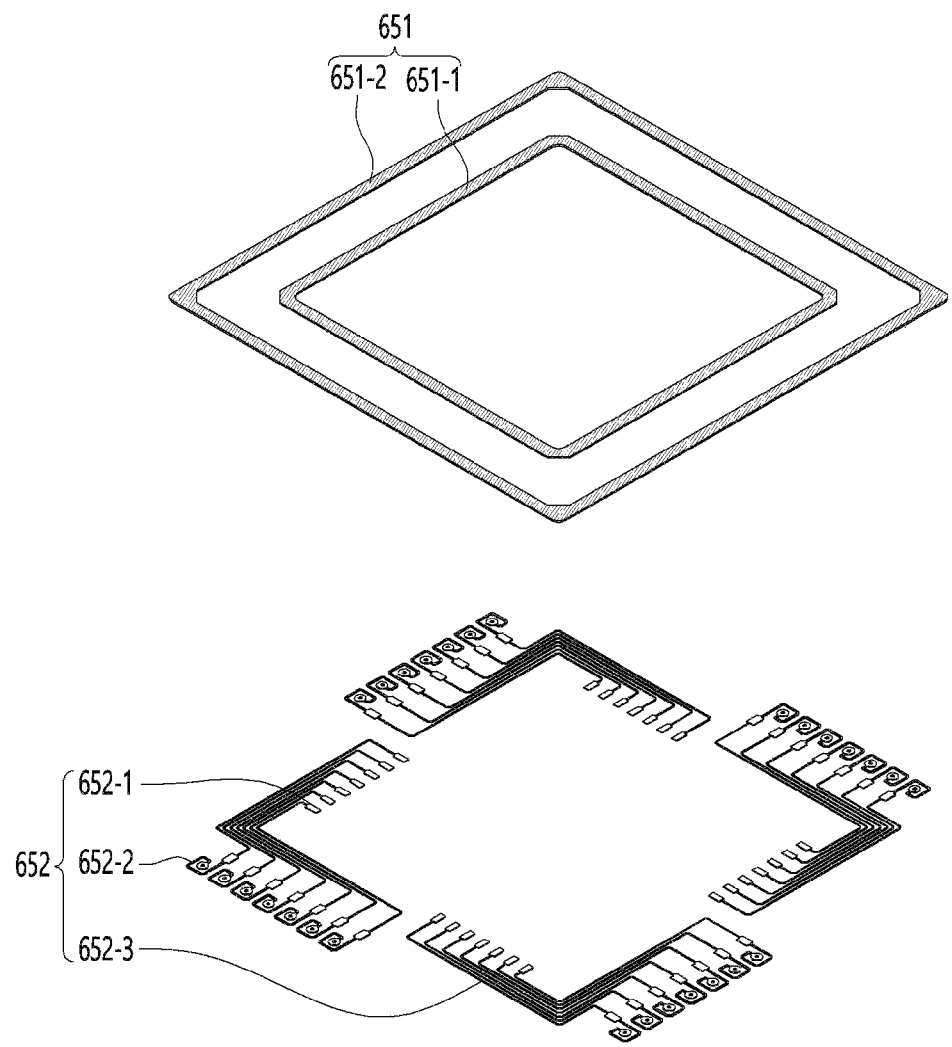
FIG. 14 is an exploded perspective view of a second elastic member of the moving part according to the embodiment.
Figure 15:
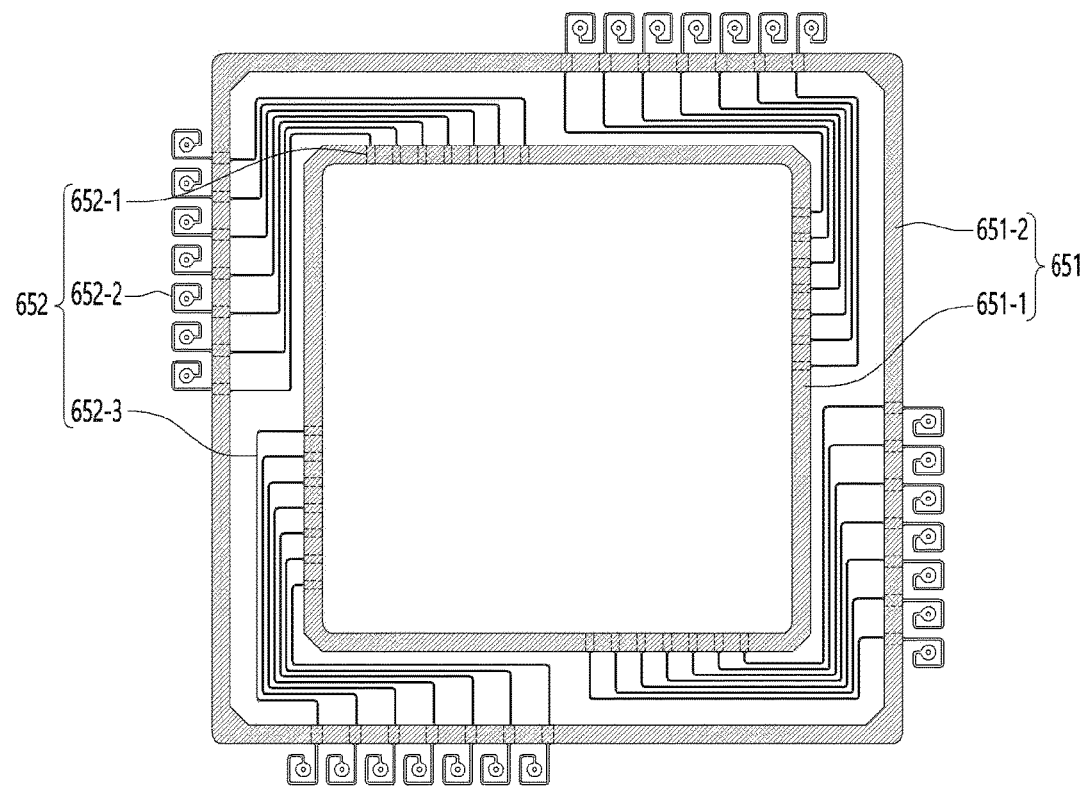
FIG. 15 is a plan view of the second elastic member of FIG. 14.
Figure 16:
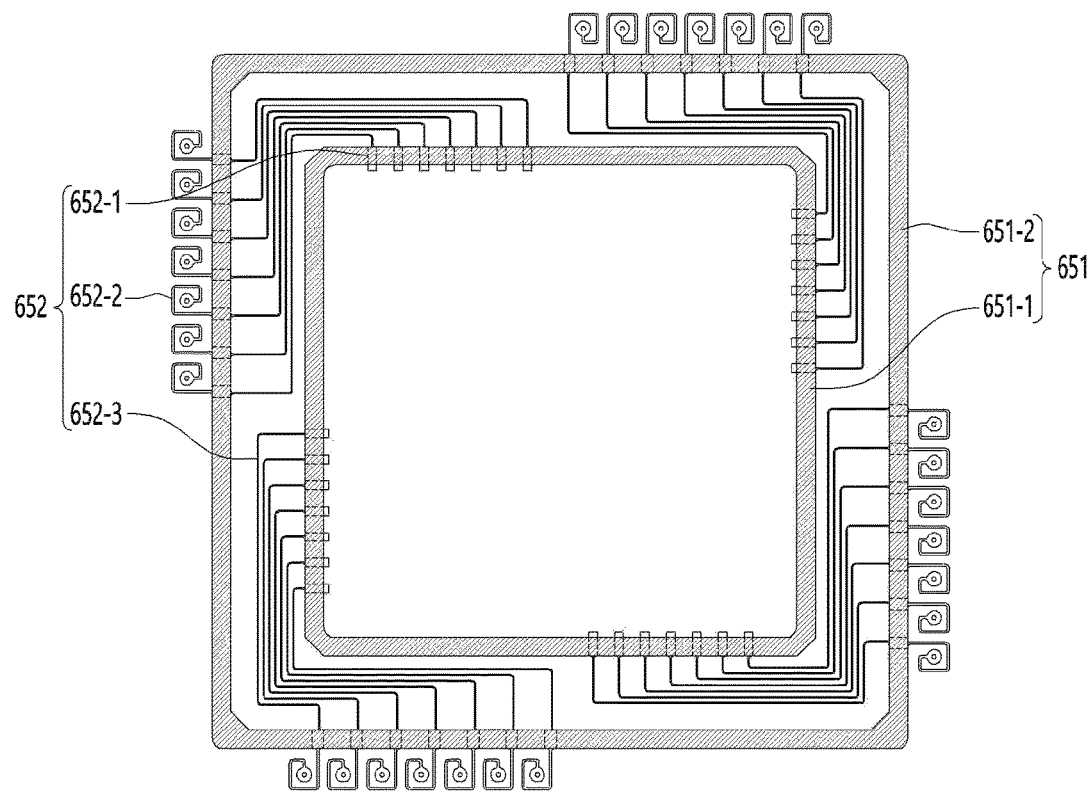
FIG. 16 is a plan view according to a modified example of the second elastic member of FIG. 14.
Figure 17:
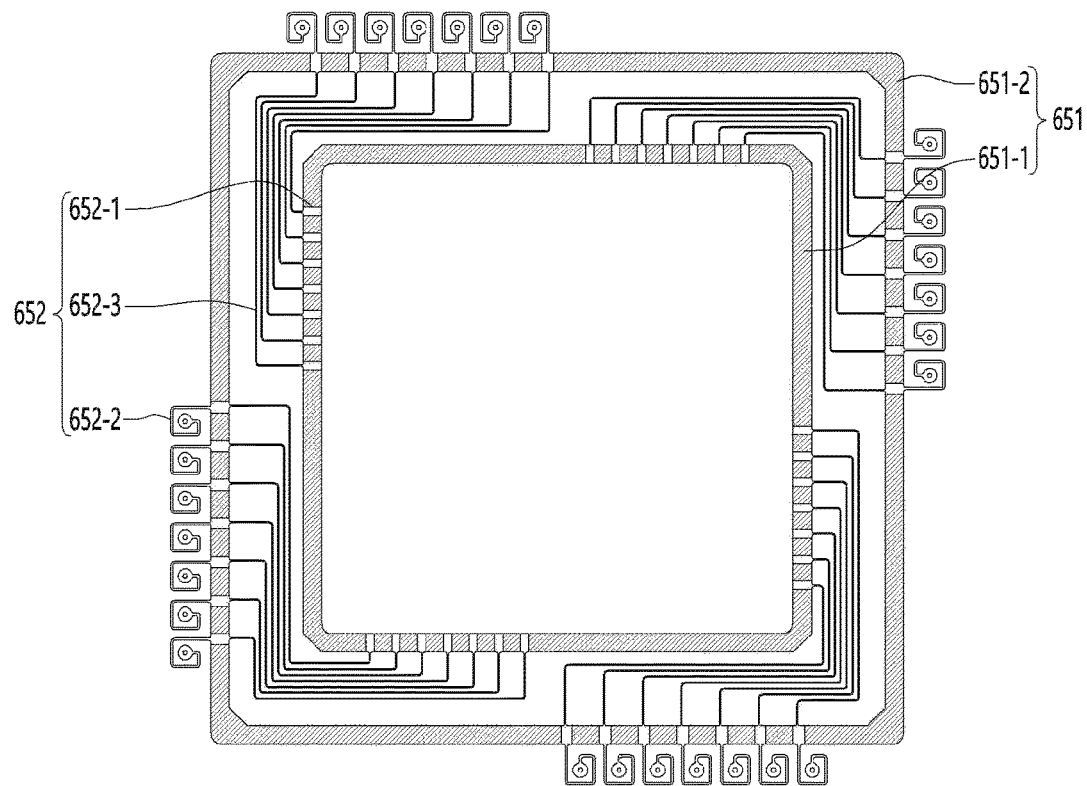
FIG. 17 is a bottom view of the second elastic member of FIG. 14.
Figure 18:
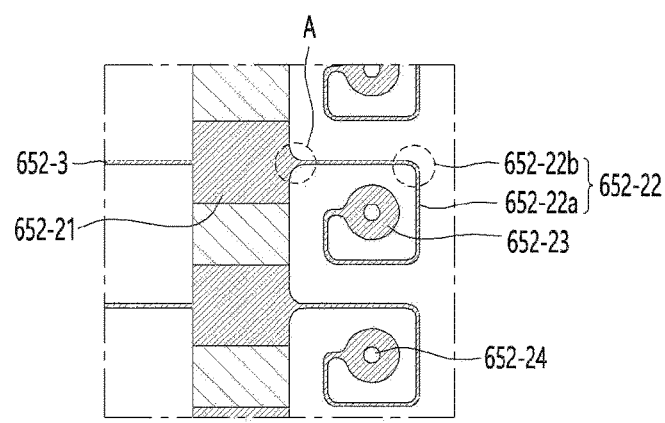
FIG. 18 is an enlarged view of a specific region of the second elastic member of FIG. 17.
Figure 19:
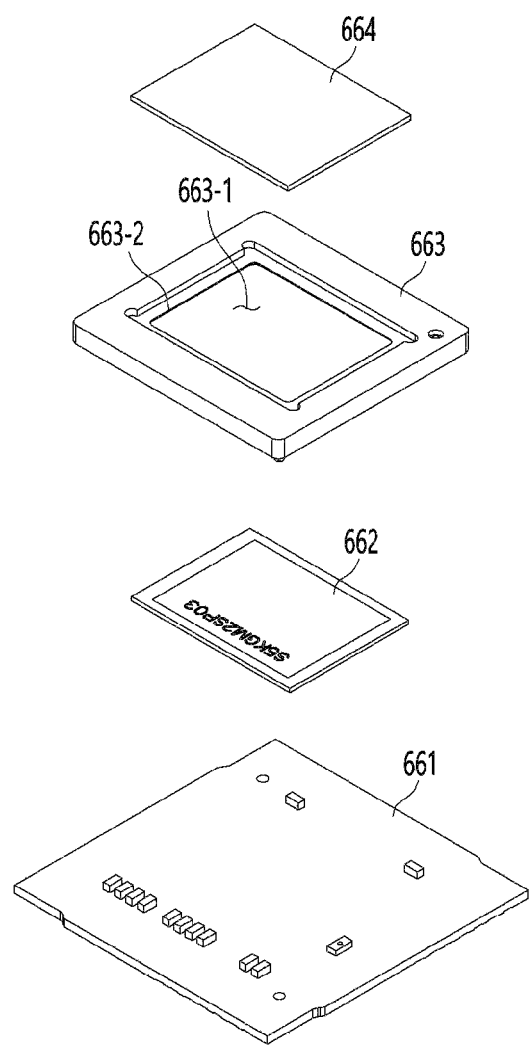
FIG. 19 is an exploded perspective view of an image sensor module of the moving part according to the embodiment.
Figure 20:
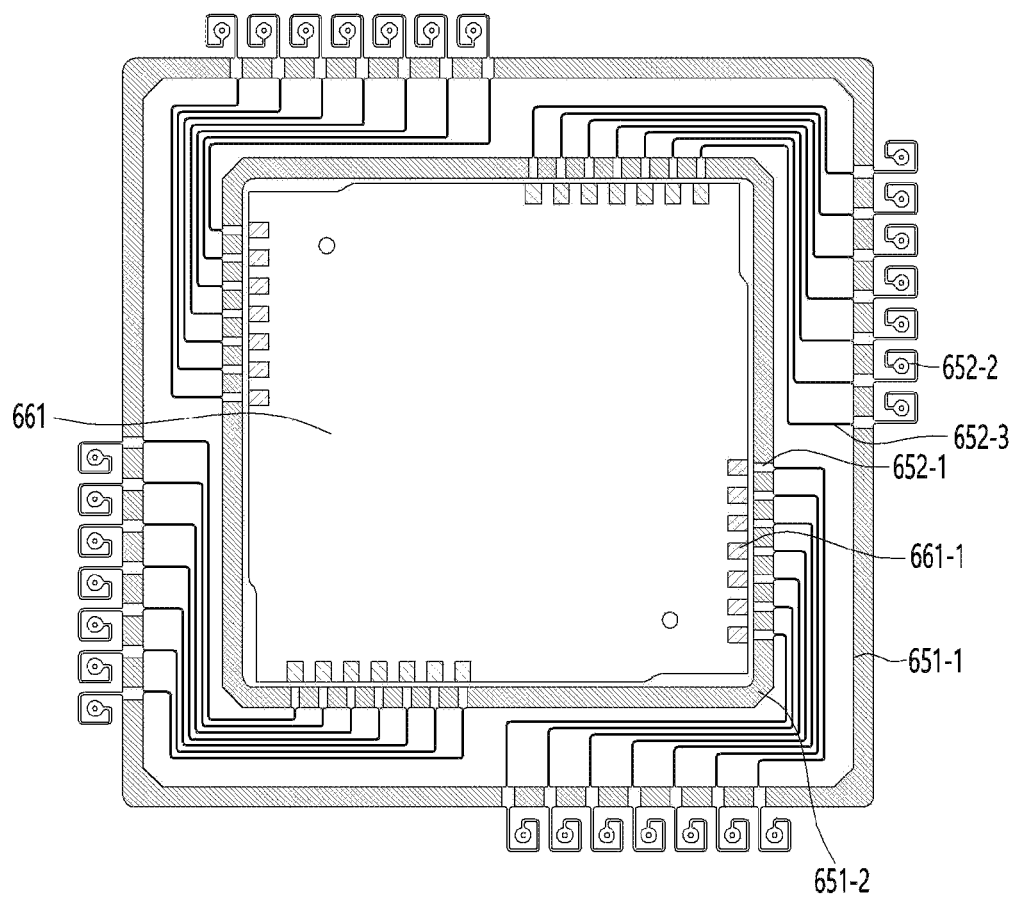
FIG. 20 is a view showing a coupling between a second elastic member and an image sensor module.
Figure 21:
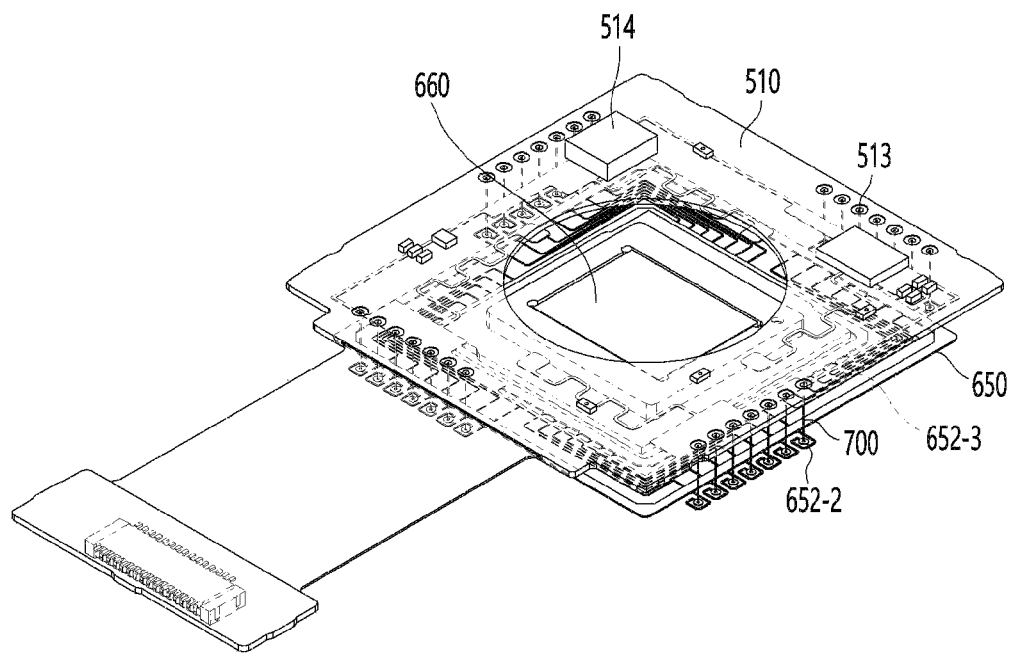
FIG. 21 is a perspective view with a specific configuration removed from the sensor driving device according to the embodiment.

FIG. 5 is an exploded perspective view of an actuator shown in FIG. 4, FIG. 6 is a perspective view of a first holder of a fixed part shown in FIG. 5, FIG. 7 is an exploded perspective view of a first substrate constituting a fixed part of the actuator shown in FIG. 5, FIG. 8 is a view showing a coupling between the first substrate part and the wire part according to the embodiment, FIG. 9 is an exploded perspective view of a moving part of an actuator according to the embodiment, FIG. 10 is a perspective view of a second holder of the moving part according to the embodiment, FIG. 11 is a view showing a coupling between a second holder and a second elastic member according to the embodiment, FIG. 12A is a perspective view of a third holder of the moving part according to the embodiment, FIG. 12B is a view showing a coupling of a third holder, a first elastic member, a sensing magnet, a second coil part, and a magnet part according to the embodiment, FIG. 13 is a view showing an arrangement relationship of a first coil part, a second coil part, and a magnet part constituting a driving part of the actuator according to the embodiment, FIG. 14 is an exploded perspective view of a second elastic member of the moving part according to the embodiment, FIG. 15 is a plan view of the second elastic member of FIG. 14, FIG. 16 is a plan view according to a modified example of the second elastic member of FIG. 14, FIG. 17 is a bottom view of the second elastic member of FIG. 14, FIG. 18 is an enlarged view of a specific region of the second elastic member of FIG. 17, FIG. 19 is an exploded perspective view of an image sensor module of the moving part according to the embodiment, FIG. 20 is a view showing a coupling between a second elastic member and an image sensor module, FIG. 21 is a perspective view with a specific configuration removed from the sensor driving device according to the embodiment.

The actuator 400 in the embodiment may be a sensor driving device. The actuator 400 may be an AF module that performs an AF function by moving a sensor. The actuator 400 may be an OIS module that performs an OIS function by moving a sensor.

The actuator 400 may include a fixed part 500 having a fixed position, and a moving part 600 whose position is moved by the electromagnetic force of the driving part in a state coupled to the fixed part 500.

The fixed part 500 may refer to a component that does not change position when the actuator 400 is driven among components of the actuator 400 and maintains a fixed state.

Also, the moving part 600 may refer to a component whose position moves together with the image sensor 662 among components of the actuator 400 when the actuator 400 is driven.

Hereinafter, each component constituting the actuator 400 will be described.

Referring to FIGS. 5 to 24, the actuator 400 includes a fixed part 500 and a moving part 600.

The fixed part 500 of the actuator 400 may include a first substrate part and a first holder 550. In addition, the first substrate part may include a first substrate 510 and a first coil part 520 disposed on the first substrate 510. The first coil part 520 may be a component of a driving part for driving the actuator 400.

The moving part 600 of the actuator 400 may include a second holder 610, a third holder 620, a driving part 630, a first elastic member 640, a second elastic member 650 and an image sensor module 660. Here, the driving part includes the first coil part 520 of the first substrate part. That is, the driving part of the actuator 400 may include a part disposed on the fixed part 500 and the other part disposed on the moving part 600. In addition, a part of the driving part may include a first coil part 520 disposed on the first substrate 510. In addition, the remaining part of the driving part may include a magnet part 630a and a second coil part 635 disposed on the second holder 610 and the third holder 620 of the moving part 600.

In addition, the actuator 400 may include a housing 800. The housing 800 may have an accommodation space for accommodating some or all of the components constituting the actuator 400. For example, the housing 800 may accommodate a part of the first substrate 510, the first coil part 520, the second holder 610, the third holder 620, the magnet part 630a, the second coil part 635, the first elastic member 640, and the image sensor module 660. However, the embodiment is not limited thereto, and some of the components may be omitted or disposed outside the housing 800.

Meanwhile, the fixed part 500 and the moving part 600 may be electrically connected to each other by a wire part 700. Here, a length of the wire part 700 may be greater than sum of a thickness of the fixed part 500 and a thickness of the moving part 600. Accordingly, the moving part 600 may be disposed below the fixed part 500 while being spaced apart from the fixed part 500 by a predetermined interval.

That is, the moving part 600 is arranged in a state (or flying state) suspended from the fixed part 500 by the wire part 700. In addition, the moving part 600 may move relative to the fixed part 500 by electromagnetic force generated by a driving part including the first coil part 520, the second coil part 635 and the magnet part 630a.

The wire part 700 may connect between the fixed part 500 and the substrate 510. The wire part 700 may have elasticity. The wire part 700 may be an elastic member. The wire part 700 may be a wire spring. The wire part 700 may electrically connect between a lead pattern part of the fixed part 500 and a lead pattern part of the moving part 600 in a state which the fixed part 500 and the moving part 600 are spaced apart by a predetermined interval. The wire part 700 may be formed of metal. The wire part 700 may elastically support the movement of the moving part 600.

The wire part 700 may include a plurality of wires. The wire part 700 may correspond to a number of channels of signals exchanged between the moving part 600 and the fixed part 500. Seven wire parts 700 may be respectively disposed in a region between adjacent corners among four corners of the fixed part 500 and the moving part 600. Accordingly, the wire part 700 may include 28 wires, but is not limited thereto.

The wire part 700 may be disposed adjacent to different corner regions in a region between the fixed part 500 and the moving part 600.

For example, the region between the fixed part 500 and the moving part 600 may include a first corner region corresponding to a lower right side, a second corner region corresponding to a lower left side, a third corner region corresponding to an upper left side, and a fourth corner region corresponding to an upper right side. In addition, the wire part 700 may include first to fourth wires 710, 720, 730, and 740 disposed adjacent to each of the first to fourth corner regions.

In this case, each of the first to fourth wires 710, 720, 730, and 740 may be disposed adjacent to different corner regions among the first to fourth corner regions.

For example, the first wire 710 may be disposed adjacent to the first corner region between the first corner region and the fourth corner region.

For example, the second wire 720 may be disposed adjacent to the second corner region between the first corner region and the second corner region.

For example, the third wire 730 may be disposed adjacent to the third corner region between the second corner region and the third corner region.

For example, the fourth wire 740 may be disposed adjacent to the fourth corner region between the third corner region and the fourth corner region.

The arrangement structure of the wire part 700 can improve the reliability of the rotation when the moving part 600 rotates with respect to the fixed part 500. In this way, the OIS operation accuracy can be increased.

That is, the wire part 700 may be evenly distributed in each of the four corner regions. In this case, each of the first to fourth wires 710, 720, 730, and 740 disposed adjacent to different corner regions may have the same number of wires.

The wire part 700 must elastically support the moving part 600 with respect to the fixed part 500 while transmitting a signal. Here, when the number of wires of each of the first to fourth wires 710, 720, 730, and 740 is different from each other, a difference occurs in the amount of movement between a portion having a large number of wires and a portion having a small number of wires. In addition, a problem may occur in operation reliability due to the difference in the movement amount.

Accordingly, the wire part 700 in the embodiment is uniformly disposed in adjacent regions of different corner regions while having a circular arrangement structure. Through this, the embodiment can improve the reliability when tilting, shifting, or rotating the image sensor.

The actuator 400 as described above will be described in detail as follows.

—Housing—

A housing 800 may include an opening formed in a center. The housing 800 includes a lower portion. Also, the housing 800 may include a side wall portion protruding from an edge region of the lower portion. Accordingly, the opening may be formed on a lower surface of the housing 800. In addition, an upper side of the housing 800 may have an open shape. The housing 800 may be coupled to the first case 200. For example, the housing 800 may be coupled to a lower side of the first case 200. In addition, an exposed portion (not shown) may be formed between the housing 800 and the first case 200. The exposed portion allows a portion of the first substrate 510 accommodated in the housing 800 to be exposed to the outside of the housing 800. At this time, the drawing shows that the exposed portion is formed on the lower side of the first case 200, but the embodiment is not limited thereto. For example, the exposed portion may be formed on an upper side of the side wall portion of the housing 800.

—Fixed Part—

The actuator 400 includes a fixed part 500. The fixed part 500 includes a first substrate 510, a first coil part 520, and a first holder 550.

The first holder 550 may be a substrate holder. For example, the first holder 550 allows a portion of the first substrate 510 to be stably seated in the housing 800.

The first holder 550 may be a protective part that protects an upper region of the first substrate 510. For example, the first holder 550 may be a protective part that protects various electronic components disposed on the first substrate 510. For example, the first substrate 510 may include various electronic components disposed on an upper surface. In addition, the various electronic components disposed on the upper surface of the first substrate 510 may be covered by the first holder 550.

Accordingly, the first holder 550 may be disposed on the first substrate 510.

The first holder 550 may be a plate-shaped member disposed on the first substrate 510. A first opening 551 may be formed in the center of the first holder 550. The first opening 551 may be aligned with the lens module 100 in an optical axis direction. The first opening 551 may have a circular shape. For example, the first opening 551 may have a circular shape to correspond to the shape of the lens module 100. However, the embodiment is not limited thereto, and the shape of the first opening 551 may be variously changed.

The first holder 550 may include a plurality of first recesses 552 recessed in an inward direction on a side surface.

For example, referring to FIG. 6(a), the first holder 550 includes a first-first recess 552-1 formed on a first side surface, and a first-second recess 552-2 formed on a second side surface, a first-third recess 552-3 formed on a third side surface, and a first-fourth recess 552-4 formed on a fourth side surface.

The first recess 552 of the first holder 550 may expose some components disposed on the upper surface of the first substrate 510. For example, the first recess 552 of the first holder 550 may expose a first lead pattern part 513 disposed on the upper surface of the first substrate 510. Accordingly, the position and area of the first recess 552 of the first holder 550 may correspond to the arrangement position and area of the first lead pattern part 513 disposed on the upper surface of the first substrate 510.

Meanwhile, the first holder 550 may include a second opening 553. The second opening 553 may be a component exposed portion exposing a portion of an electronic component disposed on the first substrate 510. For example, the second opening 553 may be an exposed portion exposing a gyro sensor 514 disposed on the upper surface of the first substrate 510. The second opening 553 may be a passing portion passing through the upper and lower surfaces of the first holder 550. Accordingly, a part of the gyro sensor 514 disposed on the upper surface of the first substrate 510 may be exposed through the second opening 553 of the first holder 550. For example, a part of the gyro sensor 514 may protrude on the upper surface of the first holder 550 through the second opening 553.

Accordingly, a thickness of the first holder 550 in the embodiment does not need to be increased to correspond to an element thickness of the gyro sensor 514. Through this, the thickness of the product in the embodiment may be reduced.

Meanwhile, a plurality of second recesses 554 may be formed on a lower surface of the first holder 550. The plurality of second recesses 554 may be a component accommodating portion in which a part of the electronic component disposed on the upper surface of the first substrate 510 is accommodated. That is, some of the electronic components disposed on the first substrate 510 may be accommodated in the second recess 554 of the first holder 550 to be protected.

The second recess 554 may be formed in a corner portion of the lower surface of the first holder 550. For example, the second recess 554 may include a second-first recess 554-1 formed on a first corner portion of the lower surface of the first holder 550, a second-second recess 554-1 formed on a second corner portion of the first holder 550, a second-third recess 554-3 formed on a third corner portion, and a second-fourth recess 554-4 formed on a fourth corner portion. A part of the electronic component disposed on the first substrate 510 may be accommodated in the second recess 554 of the first holder 550. Meanwhile, the second opening 553 may be formed on a corner portion in which any one of a plurality of second recesses is formed. For example, the second opening 553 may be formed in the second-first recess 554-1 formed on the first corner portion. Accordingly, a part of the second-first recess 554-1 may include the second opening 553.

For example, a driver IC 515 of the electronic components disposed on the first substrate 510 may be disposed in a part of the plurality of second recesses 554. In addition, a capacitor may be disposed in the remaining part of the plurality of second recesses 554. In addition, a memory may be disposed in other remaining part of the plurality of second recesses 554.

Meanwhile, the fixed part 500 may include the first substrate 510. In this case, the first holder 550 may be disposed on the first substrate 510.

The first substrate 510 includes a first substrate region 511 having a third opening 512 formed in a center thereof. In addition, the first substrate 510 includes a second substrate region 519. The second substrate region 519 extends from the first substrate region 511. A connector 519a connected to an external device may be disposed on the second substrate region 519.

The first substrate 510 may include a first lead pattern part 513 disposed on the first substrate region 511. The first substrate 510 may be coupled to the wire part 700 on the first lead pattern part 513. That is, one end of the wire part 700 may be coupled to the first lead pattern part 513 of the first substrate 510. The first lead pattern part 513 and the wire part 700 may be coupled through soldering. The first lead pattern part 513 may be a part in which a solder resist is opened for electrical connection with the wire part 700.

Specifically, the first lead pattern part 513 includes a first hole 513-2 and a first lead pattern 513-1 disposed around the first hole 513-2. That is, the first lead pattern part 513 may be a pad including a first hole 513-2 through which the wire part 700 passes. Accordingly, the wire part 700 is soldered while passing through the first hole 513-2, and through this, the first lead pattern 513-1 disposed around the first hole 513-2 can be electrically connected.

The first lead pattern part 513 is configured in plurality. That is, the first lead pattern part 513 includes a plurality of first lead patterns. In addition, the plurality of first lead patterns are connected to the wire part 700. In this case, a number of the first lead patterns may be equal to or less than a number of the wire parts 700. When the number of first lead patterns is the same as the number of the wire part 700, all of the first lead patterns may be coupled to the wire part. In addition, when the number of first lead patterns is less than the number of the wire part 700, at least one of the first lead patterns may not be coupled to the wire part.

A connector 519a may be disposed on the second substrate region 519 connected to the first substrate region 511. The connector 519a may be a port for electrically connecting to an external device. At this time, although it is illustrated that the connector 519a is disposed on a lower surface of the second substrate region 519 in the drawing, the embodiment invention is not limited thereto. For example, the coil part 520 may be disposed on the upper surface of the second substrate region 519.

In this case, the first substrate region 511 is disposed inside the camera device. The second substrate region 519 may extend from the first substrate region 511 to be exposed to the outside of the camera device.

That is, the first substrate region 511 is disposed in an accommodation space formed by the first case 300 and the housing 800. In addition, the second substrate region 519 may be exposed to an outside of the accommodation space and may be connected to an external device through a connector 519a.

The first substrate 510 may transmit a signal to the moving part 600 or receive a signal transmitted from the moving part 600.

That is, the first substrate 510 is electrically connected to the moving part 600 through the wire part 700. Accordingly, the first substrate 510 transmits a power signal or a communication signal to the moving part 600 through the wire part 700. Also, the first substrate 510 may receive an image signal obtained from the image sensor module 660 of the moving part 600 through the wire part 700.

The first substrate 510 may include a plurality of electronic components. For example, a plurality of electronic components may be mounted on the first substrate region 511 of the first substrate 510. For example, the gyro sensor 514 may be mounted on the first substrate region 511 of the first substrate 510. For example, the driver IC 515 may be mounted on the first substrate region 511 of the first substrate 510. For example, a capacitor or a memory may be mounted on the first substrate region 511 of the first substrate 510.

That is, the gyro sensor 514 for implementing the handshake prevention in the present embodiment is mounted on the first substrate 510 and is embedded. Through this, angular velocity/linear velocity detection information due to hand shake in the present embodiment may be feedback to the moving part 600. Accordingly, there is an effect that it is not necessary to provide an additional space for the arrangement of the gyro sensor 514 in the embodiment, by disposing the gyro sensor 514 on the first substrate 510.

Meanwhile, the gyro sensor 514 may be exposed onto the first holder 550 through the second opening 553 of the first holder 550 disposed on the first substrate 510. Accordingly, the sensing performance of the gyro sensor 514 may be improved in the embodiment.

In addition, electronic components such as a driver IC 515, a capacitor and a memory are mounted on the first substrate 510. In this case, the mounted electronic component is accommodated in the second recess 554 of the first holder 550. Through this, the embodiment may stably protect the electronic component from risk factors occurring in various operating environments of the sensor driving device.

Meanwhile, the first lead pattern part 513 formed on the first substrate 510 may be exposed through the first recess 552 of the first holder 550. That is, the first lead pattern part 513 is exposed through the first recess 552 of the first holder 550 in a state in which the first holder 550 is disposed on the first substrate 510. In addition, the embodiment allows the first lead pattern part 513 exposed through the first recess 552 to be used as a test pad when testing the signal transmission performance of a sensor drive device, and accordingly, the embodiment can easily perform a test operation.

Meanwhile, a part of a driving part for driving the actuator 400, which is a sensor driving device, may be disposed on a lower surface of the first substrate 510. For example, the first coil part 520 may be disposed on the lower surface of the first substrate 510. At this time, when only the OIS operation is considered, the actuator 400 may operate in a magnet movement method in which the magnet moves with respect to the coil. However, when the AF operation is considered, the actuator 400 may operate in a coil movement method in which a coil moves with respect to the magnet. That is, the embodiment includes a plurality of driving parts for AF and OIS operations. Each of the plurality of driving parts may include a coil part and a magnet part. However, in the embodiment, the magnet parts of the plurality of driving parts are shared as one. And, the moving operation of the moving part 600 in an embodiment is made using the single common magnet part. For example, the moving part 600 may be tilted, shifted, or rotated together with the single common portion according to the strength and direction of current applied to the plurality of coil parts.

This will be described in more detail below.

The first coil part 520 may include a plurality of coils. For example, the first coil part 520 may include a first-first coil 521 disposed on a first corner region of a lower surface of the first substrate 510, a first-second coil 522 disposed on a second corner region of the first substrate 510, a first-third coil 523 disposed on a third corner region, and a first-fourth coil 524 disposed on a fourth corner region.

The first coil part 520 may face the magnet part 630a disposed on the moving part 600. For example, the first-first coil 521 may be disposed to face the first magnet 631 of the magnet part 630a. Also, the first-second coil 522 may be disposed to face the second magnet 632 of the magnet part 630a. Also, the first-third coil 523 may be disposed to face the third magnet 633 of the magnet part 630a. Also, the first-fourth coil 524 may be disposed to face the fourth magnet 634 of the magnet part 630a.

Meanwhile, the coil part 520 may be disposed to face a plurality of poles of the magnet part 630a.

For example, the first-first coil 521 may face the N pole and the S pole of the first magnet 631 of the magnet part 630a in the vertical direction (or the z-axis direction or the optical axis direction).

For example, the first-second coil 522 may face the N pole and the S pole of the second magnet 632 of the magnet part 630a in a vertical direction (or the z-axis direction or the optical axis direction).

For example, the first-third coil 523 may face the N pole and the S pole of the third magnet 633 of the magnet part 630a in the vertical direction (or the z-axis direction or the optical axis direction).

For example, the first-fourth coil 524 may face the N pole and the S pole of the fourth magnet 634 of the magnet part 630a in the vertical direction (or the z-axis direction or the optical axis direction).

In the embodiment, the OIS operation is performed according to the direction and strength of the current applied to the first coil part 520.

For example, the moving part 600 in the embodiment may move in the x-axis direction with respect to the fixed part 500 according to the direction and strength of the current applied to a specific coil of the first coil part 520.

For example, the moving part 600 in the embodiment may move in the y-axis direction with respect to the fixed part 500 according to the direction and strength of the current applied to a specific coil of the first coil part 520.

For example, the moving part 600 in the embodiment may move in the z-axis direction with respect to the fixed part 500 according to the direction and strength of the current applied to a specific coil of the first coil part 520

The arrangement structure and control operation of the first coil part 520 as described above will be described in detail as follows.

The first coil part 520 may include four coils.

At this time, current may be independently applied to at least three coils among the four coils. In the first embodiment, the first coil part 520 may be controlled through three control channels. Alternatively, the first coil part 520 in a second embodiment may be controlled through four individual control channels.

The four coils constituting the first coil part 520 may be electrically separated from each other. Any one of a forward current and a reverse current may be selectively applied to each of the four coils of the first coil part 520. In this embodiment, three coils among the four coils may be electrically separated, and the other coil may be electrically connected to any one of the three coils. Alternatively, all four coils may be electrically separate. When only three coils among the four coils are electrically separated, three pairs of six lead wires may come out from the first coil part 520. Also, when all four coils are electrically separated, four pairs of eight lead wires may come out from the first coil part 520.

Also, when the four coils are controlled by three control channels, a pair of first coil parts 520 and magnet parts 630a may be driven to rotate the z-axis as a central axis.

In addition, when four coils are controlled by four control channels, two pairs of the first coil part 520 and the magnet part 630a may be driven to rotate the z-axis as a central axis.

The first coil part 520 as described above may be disposed to face the magnet part 630a, respectively. The first coil part 520 is disposed on each corner region of the lower surface of the first substrate 510. In addition, the first-first coil 521-1 and the first-third coil 521-3 may be disposed on the lower surface of the first substrate 510 in a first diagonal direction. Also, the first-second coil 521-2 and the first-fourth coil 521-4 may be disposed on the lower surface of the first substrate 510 in second diagonal direction. The first-first coil 521-1 and the first-third coil 521-3 are elongated on the lower surface of the first substrate 510 in the first direction. The first-second coil 521-2 and the first-fourth coil 521-4 may be elongated on the lower surface of the first substrate 510 in a second direction orthogonal to the first direction. For example, a long side of the first-first coil 521-1 and a long side of the first-third coil 521-3 may be disposed parallel to each other. In addition, a long side of the first-second coil 521-2 and a long side of the first-fourth coil 521-4 may be disposed parallel to each other.

Each of the long sides of the first-first coil 521-1 and the first-third coil 521-3 may orthogonal to each of the long sides of the first-second coils 521-2 and the first-fourth coils 521-4.

Meanwhile, the first substrate 510 may include a position sensor part. The position sensor part detects a position of the magnet part 630a with respect to the first coil part 520.

In the embodiment, a position detection sensor may be disposed to correspond to three coils among four coils constituting the first coil part 520. The position detection sensor may be a magnetic sensor. For example, the position detection sensor may be a Hall sensor. Specifically, first to third Hall sensors 516, 517, and 518 may be disposed on the first substrate 510. In this case, the first to third Hall sensors 516, 517, and 518 may be disposed on a surface of the first substrate 510 opposite to a surface on which the first coil part 520 is disposed. For example, the first coil part 520 may be disposed on the lower surface of the first substrate 510. In addition, the first to third Hall sensors 516, 517, and 518 may be disposed on the upper surface of the first substrate 510. However, the embodiment is not limited thereto. The first to third Hall sensors 516, 517, and 518 may be disposed in inner regions of different coils on the same surface of the first substrate 510 as the surface on which the first coil part 520 is disposed.

On the other hand, when the surface on which the Hall sensor is disposed and the surface on which the first coil part 520 is disposed are different from each other, the Hall sensor may be disposed on a region overlapping an inner region of the first coil part 520 among the upper surface of the first substrate 510.

In this case, the Hall sensor may in the embodiment be disposed to correspond to three coils among four coils constituting the first coil part 520. In one embodiment, the first coil part 520 including four coils is controlled by three control channels. Accordingly, any one of the four coils do not need to be provided with the Hall sensor. The first to third Hall sensors 516, 517, and 518 may detect a magnetic force of a magnet of the magnet part 630a. Movement of the image sensor module may be detected in real time through the magnetic force of the magnet part 730 detected by the first to third Hall sensors 516, 517, and 518. And through this, OIS feedback control may be possible.

In the embodiment, the Hall sensor for the OIS operation is composed of three first to third Hall sensors 516, 517, and 518. In addition, movement in the x-axis direction, movement in the y-axis direction, and rotation around the z-axis of the image sensor may all be detected through the three Hall sensors.

—Moving Part—

Hereinafter, the moving part 600 will be described.

The moving part 600 may be spaced apart from the fixed part 500 by a predetermined interval through the wire part 700.

And, the moving part 600 may move in the x-axis direction by electromagnetic force provided from the driving part. Also, the moving part 600 may move in the y-axis direction by electromagnetic force provided from the driving part. Also, the moving part 600 may move in the z-axis direction by electromagnetic force provided from the driving part. Also, the moving part 600 may rotate the z-axis as a rotation axis by electromagnetic force provided from the driving part.

The moving part 600 may include a second holder 610, a third holder 620, an AF driving part 630, a first elastic member 640, a second elastic member 650, and an image sensor module 660.

Meanwhile, it was said that the moving part 600 includes a second holder 610, a third holder 620, an AF driving part 630, a first elastic member 640, a second elastic member 650, and an image sensor module 660. This is, because the second holder 610, the third holder 620, the AF driving part 630, the first elastic member 640, the second elastic member 650 and the image sensor module 660 moves when considering both the OIS operation and the AF operation in the overall structure of the actuator 400. However, when only the AF operation is performed in the embodiment, the second holder 610 of the moving part 600 operates as a fixed part, and the third holder 620 and the image sensor module 660 of the moving part 600 operates as a moving part.

In other words, when the OIS operation is performed in the sensor driving apparatus of the embodiment, the first substrate 510 is a fixed part, and the second holder 610, the third holder 620, and the AF driving part 630, the first elastic member 640, the second elastic member 650, and the image sensor module 660 may be a moving part.

In addition, when the AF operation is performed in the sensor driving device of the embodiment, the second holder 610 is a fixed part, and the third holder 620, the second elastic member 650 and the image sensor module 660 may be a moving part.

However, the sensor driving apparatus according to the embodiment may perform both the AF operation and the OIS operation. Accordingly, the second holder 610, the third holder 620, the AF driving part 630, the first elastic member 640, the second elastic member 650, and the image sensor module 660 may be moving part.

On the other hand, the third holder 620 of the moving part 600 in the embodiment is elastically supported to the second holder 610 through the first elastic member 640 and the second elastic member 650 in the vertical direction. And, the second holder 610 may move in the x-axis direction, move in the y-axis direction, and rotate around the z-axis as a rotation axis by the electromagnetic interaction of the AF driving part 630 and the first coil part 520. Through this, the OIS function in the embodiment may be performed.

In the embodiment, the autofocus (AF) function may be performed as the third holder 620 moves in the z-axis direction by the electromagnetic interaction of the AF driving part 630.

The moving part 600 of the actuator 400 includes a second holder 610.

The second holder 610 may be a magnet holder in which the magnet part 630a in the embodiment is disposed. The second holder 610 may have a fourth opening 611 overlapping the first opening 551 of the first holder 550 and the third opening 511 of the first substrate 510 in the z-axis direction (optical-axis direction). A shape of the fourth opening 611 may correspond to a shape of the third holder 620. Preferably, the fourth opening 611 may be a region in which the third holder 620 is disposed.

The second holder 610 may include a first region 612 corresponding to an edge region, and a second region 613 between the first region 612 and the fourth opening 611.

In addition, a through hole 616 may be formed in the first region 612 of the second holder 610. In this case, the through hole 616 may be aligned with the first hole 513-1 of the first lead pattern part 513 formed on the first substrate 510 in the optical axis direction. The through hole 616 may be a wire through hole through which the wire part 700 coupled to the first lead pattern part 513 of the first substrate 510 passes. Through holes 616 corresponding to the number of wires constituting the wire part 700 may be formed in the first region 612 of the second holder 610. For example, the number of through holes 616 formed in the first region 612 of the second holder 610 may be 27, but is not limited thereto.

The second region 613 of the second holder 610 may have a step difference from the first region 612. A third recess 614 in which the magnet part 630a is seated may be formed on the second region 613 of the second holder 610. The third recess 614 may correspond to the first coil part 520 disposed on the third recess 614. For example, the third recess 614 may include third-first to third-fourth recesses 614-1, 614-2, 614-3, and 614-4 corresponding to the first-first to first-fourth coils 521, 522, 523, and 524 constituting the first coil part 520. Preferably, the third-first recess 614-1 may correspond to the first-first coil 521. Preferably, the third-first recess 614-1 may be formed in a region facing the first-first coil 521 of the second region 613 of the second holder 610. The third-second recess 614-2 may be formed in a region facing the first-second coil 522 of the second region 613 of the second holder 610. The third-third recess 614-3 may be formed in a region facing the first-third coil 523 in the second region 613 of the second holder 610. The third-fourth recess 614-4 may be formed in a region facing the first-fourth coil 524 of the second region 613 of the second holder 610.

The third-first recess 614-1 may be a seating portion on which the first magnet 631 of the magnet part 630a constituting the AF driving part 630 is seated. The third-second recess 614-2 may be a seating portion on which the second magnet 632 of the magnet part 630a constituting the AF driving part 630 is seated. The third-third recess 614-3 may be a seating portion on which the third magnet 633 of the magnet part 630a constituting the AF driving part 630 is seated. The third-fourth recess 614-4 may be a seating portion on which the fourth magnet 634 of the magnet part 630a constituting the AF driving part 630 is seated. The magnet part 630a as described above may be disposed to rotate 90 degrees to each other on the second holder 610. In addition, the third recess 614 may be formed in the second region 613 of the second holder 610 to correspond thereto.

On the other hand, the first to fourth magnets 631, 632, 633, 634 of the magnet part 630a in the third recess 614 may have an N pole and an S pole arranged in the x-axis direction or the y-axis direction. Also, the first to fourth magnets 631, 632, 633, and 634 may be disposed to face the fourth opening 611 of the second holder 610 with the same polarity.

In the drawings, the N poles of each of the first to fourth magnets 631, 632, 633, and 634 are illustrated as being disposed to face the fourth opening 611, but the embodiment is not limited thereto. For example, the S poles of each of the first to fourth magnets 631, 632, 633, and 634 in another embodiment may be disposed to face the fourth opening 611.

The N pole and S pole of each of the first to fourth magnets 631, 632, 633, 634 may be disposed to face the first-first to first-fourth coils 521, 522, 523, and 524 of the first coil part 520 by the arrangement as above.

Meanwhile, a fourth recess 615 is formed on the second region 613 of the second holder 610. The fourth recess 615 may be a coupling groove for coupling the third holder 620 to the second holder 610. The fourth recess 615 may be formed adjacent to the third recess 614. That is, the fourth recess 615 may include fourth-first to fourth-fourth recesses 615-1, 615-2, 615-3, and 615-4 disposed adjacent to the third-first recess to the third-fourth recess 614-1, 614-2, 614-3, and 614-4.

Meanwhile, the second holder 610 may include an elastic member seating portion on which the first elastic member 640 is seated. Preferably, the third recess 614 and the fourth recess 615 are formed on the second region 613 of the second holder 610. In addition, the first elastic member 640 may be disposed on a region in which the third recess 614 and the fourth recess 615 are not formed among the second region 612 of the second holder 610.

In addition, a fifth recess 617 may be formed on a lower surface of the second holder 610. The fifth recess 617 may be formed around a region in which the through hole 616 is formed among the lower surfaces of the second holder 610. The fifth recess 617 may be a seating portion on which a part of the second elastic member 650 of the moving part 600 connected to the plurality of wire parts 700 passing through the through hole 616 (clearly, the second lead pattern part 652) is seated.

That is, the second elastic member 650 of the moving part 600 in the embodiment is disposed below the second holder 610. Accordingly, the image sensor module 660 and the first substrate 510 may be electrically connected while the image sensor module 660 is moved with respect to the fixed part 500.

Meanwhile, a third holder 620 may be disposed in the fourth opening 611 of the second holder 610. Accordingly, the fourth opening 611 of the second holder 610 may have a shape corresponding to an outer shape of the third holder 620.

In this case, a size of the fourth opening 611 of the second holder 610 may be larger than a size of the third holder 620. Accordingly, a predetermined gap may be formed between the inner surface of the second holder 610 and the outer surface of the third holder 620 in a state in which the third holder 620 is disposed in the fourth opening 611 of the second holder 610.

The third holder 620 may include a fifth opening 621. The fifth opening 621 may have a shape corresponding to the lens module 100. For example, the fifth opening 621 may have a circular shape corresponding to the shape of the lens module 100, but is not limited thereto.

The third holder 620 may be coupled to the image sensor module 660. For example, the image sensor module 660 may be inserted into the fifth opening 621 of the third holder 620 to be coupled to the third holder 620.

The third holder 620 may include a plurality of first protrusions 622 protruding outward. The first protrusion 622 of the third holder 620 may have a size and shape corresponding to the fourth recess 615 of the second holder 610.

The first protrusion 622 of the third holder 620 may be disposed in the fourth recess 615 of the second holder 610. Accordingly, when the first holder 550 in which the magnet part 630a is disposed is moved by the electromagnetic force generated between the first coil part 520 and the magnet part 630a, the third holder 620 and the image sensor module 660 disposed in the fifth opening 621 of the third holder 620 may be moved with the first holder 550. The first protrusion 622 of the third holder 620 may include first-first to first-fourth protrusions 622-1, 622-2, 622-3, and 622-4 corresponding to the fourth recess 615.

In addition, the plurality of first protrusions 622 may function as a stopper. For example, the plurality of first protrusions 622 are formed to be higher than a second protrusion 623 on which the first elastic member 640 is disposed. In addition, when the third holder 620 moves upward to a highest height, the plurality of first protrusions 622 may inhibit further movement of the third holder 620. For example, when the third holder 620 moves upward to a maximum height, upper surfaces of the plurality of first protrusions 622 may contact a lower surface of the first substrate 510. Through this, the additional movement in the upward direction of the third holder 620 may be restricted.

Meanwhile, a predetermined gap may exist between the first protrusion 622 and the fourth recess 615 in a state in which the first protrusion 622 is inserted in the fourth recess 615. For example, a predetermined gap exists between the lower surface of the first protrusion 622 and a lower surface of the fourth recess 615 in a state in which the second holder 610 and the third holder 620 are coupled to each other. Also, the predetermined gap may correspond to a distance (or stroke) at which the third holder 620 moves in a downward direction. In addition, when the third holder 620 moves downward to a lowest height, the lower surface of the first protrusion 622 may contact the lower surface of the fourth recess 615. Through this, an additional movement of the third holder 620 in the downward direction may be restricted.

A second protrusion 623 may be formed on an upper surface of the third holder 620 in a region adjacent to the first protrusion 622. The second protrusion 623 may allow the third holder 620 to be elastically supported by the first elastic member 640.

A coil winding portion 625 wound around the second coil part 520 may be formed on the third holder 620. For example, the coil winding portion 625 in the form of a recess recessed in an inward direction may be formed on the outer surface of the third holder 620. In addition, the second coil part 635 may be wound around the coil winding portion 625. The second coil part 635 may have a "coil block" shape. The second coil part 635 may be an "electromagnet". The second coil part 635 may be disposed to face the magnet part 630a with a specific polarity. Accordingly, the second coil part 635 wound around the coil winding portion 625 of the third holder 620 may electromagnetically interact with the magnet unit 630a to generate electromagnetic force. In this case, the second coil part 635 may be electrically connected to a second elastic member 650 or a first elastic member 640 to be described later. Accordingly, the second coil part 635 may receive current from the second elastic member 650 or the first elastic member 640 to generate electromagnetic force. As a result, the third holder 620 may move in the optical axis direction to perform the AF function. Preferably, the second coil part 635 is electrically connected to the second elastic member 650, thereby receiving a power signal. In this case, the second elastic member 650 may receive a power signal from the first substrate 510 through the wire part 700.

Accordingly, at least two of the plurality of wires constituting the wire part 700 may be electrically connected to the second coil part 635. In addition, the moving part 600 may include a Hall sensor (not shown) or a Hall sensor built-in driver IC (not shown) for controlling the operation of the AF driving part 630. Accordingly, some of the plurality of wires of the wire part 700 may be connected to a Hall sensor or a Hall sensor built-in driver IC for controlling the operation of the AF driving unit 630. Meanwhile, the driver IC for controlling the operation of the AF driving part 630 may be used as the driver IC 515 disposed on the first substrate 510. In this case, the wire part 700 may include only the wire connected to the second coil part 635.

On the other hand, the third holder 620 may include a sensor magnet mounting portion 624. Preferably, the third holder 620 may include a first sensor magnet mounting portion 624-1 and a second sensor magnet mounting portion 624-3. The first sensor magnet mounting portion 624-1 and the second sensor magnet mounting portion 624-3 may be disposed in a diagonal direction facing each other based on the center of the fifth opening 621 on the upper surface of the third holder 620.

A first sensor magnet 636 and a second sensor magnet 637 may be disposed in the first sensor magnet mounting portion 624-1 and the second sensor magnet mounting portion 624-3, respectively. The first sensor magnet 636 and the second sensor magnet 637 may be disposed on the third holder 620 to sense the position of the third holder 620. That is, the Hall sensors disposed on the first substrate 510 may sense a change in the magnetic field of the magnet part 630a to detect the position of the magnet part 630a and the position of the second holder 610. In addition, when the third holder 620 moves in the z-axis with respect to the first substrate 510, the first sensor magnet 636 and the second sensor magnet 637 may detect the moved position of the third holder 620.

Specifically, the distance between the first sensor magnet 636 and the second sensor magnet 637 and the first substrate 510 changes as the third holder 620 moves. Accordingly, the magnitude of the magnetic field sensed by the driver IC 515 disposed on the first substrate 510 is changed. In addition, the driver IC 515 may detect the positions of the first sensor magnet 636 and the second sensor magnet 637 based on a change in the magnitude of the changing magnetic field. Also, the driver IC 515 may detect the position of the third holder 620 and the position of the image sensor module 660.

The first elastic member 640 is disposed on the second holder 610 and the third holder 620. Accordingly, the second holder 610 and the third holder 620 may be elastically supported upward by the first elastic member 640. In addition, the second holder 610 and the third holder 620 may be elastically supported in a downward direction by a second elastic member 650 disposed below the second holder 610.

The first elastic member 640 may be a plate spring. The first elastic member 640 may be made of metal. Alternatively, the first elastic member 640 may be non-magnetic. Accordingly, the first elastic member 640 may not be affected by the magnetic force of the magnet part 630a and the electromagnetic force of the first coil part 520 or the second coil part 635.

The first elastic member 640 may be disposed on the second holder 610. Also, the first elastic member 640 may be disposed on the third holder 620. The first elastic member 640 may include an opening 641.

The first elastic member 640 includes a first elastic part 642 disposed on the third holder 620 to elastically support the third holder 620. Also, the first elastic member 640 may include a second elastic part 643 extending from the first elastic part 642 and coupled to the second holder 610.

Meanwhile, as described above, the driving part 630 in the embodiment may include an OIS driving part and an AF driving part.

The OIS driving part may include the first coil part 520.

In addition, the AF driving part may include the second coil part 635.

And the magnet part 630a may be the OIS driving part, it may be an AF driving part. That is, the magnet part 630a may be a magnet commonly used for OIS driving and AF driving.

That is, the magnet part 630a is disposed on the second holder (610).

And, the first substrate 510 is disposed on the second holder 610. In addition, a first coil part 520 is disposed on the first substrate 510.

At this time, the magnet part 630a has a magnetizing structure in which N poles and S poles are arranged in the x-axis direction or the y-axis direction. Accordingly, each of the coils constituting the first coil part 520 is disposed to face the upper surfaces of the N pole and S pole of each magnet constituting the magnet part 630a. Specifically, both the N pole and the S pole constituting the magnet part 630a may be disposed to face the first coil part 520 in the z-axis direction. Accordingly, the actuator 400 as a sensor driving device may move the magnet part 630a with respect to the first coil part 520 through electromagnetic interaction between the magnet part 630a and the first coil part 520. Accordingly, the first holder 550 in which the magnet part 630a is disposed may move in response to the movement of the magnet part 630a. Also, the second holder 610 coupled to the first holder 550 may move as a result of this. Also, the image sensor module 660 disposed in the second holder 610 may move as a result of this.

In addition, any one of the N and S poles constituting the magnet part 630a may be disposed to face the second coil part 635 in the x-axis direction or the y-axis direction. Accordingly, the actuator 400 corresponding to the sensor driving device may cause the third holder 620 to move in the z-axis direction (e.g., upward or downward) with respect to the second holder 610 through the electromagnetic interaction of the magnet part 630a and the second coil part 635.

A second elastic member 650 may be disposed under the second holder 610 and the third holder 620.

In an embodiment, the second elastic member 650 may be a substrate. Specifically, the second elastic member 650 is connected to the wire part 700 while elastically supporting the second holder 610 and the third holder 620. Accordingly, the second elastic member 650 may provide a signal transmission path between the image sensor module 660 and the first substrate 510.

The second elastic member 650 may be electrically connected to the first substrate 510 through the wire part 700. In this case, the second elastic member 650 in the embodiment may be referred to as a substrate part. That is, the second elastic member 650 includes an insulating part and a lead pattern part. The lead pattern part is formed on the insulating part. In addition, the lead pattern part may transmit an electrical signal while elastically supporting the second holder 610 and the third holder 620. However, the insulating part in the embodiment is not an essential component and may be optionally omitted. For example, the insulating part may be omitted or removed in the description of the second elastic member 650 below. That is, the second elastic member 650 in the embodiment may include only the wiring pattern part in the part to be described below. And, when the second elastic member 650 includes only the wiring pattern part, it may be manufactured by the following method. That is, when the second elastic member 650 includes only the wiring pattern part, the wiring pattern part has a structure in which all lines are connected to each other and may be coupled to the second holder 610 and the third holder 620. And, after being connected to the wire part 700 and the image sensor module 660, the wiring pattern part may be separated so as to have a plurality of signal lines by processing using a laser or the like. However, hereinafter, the second elastic member 650 will be described as including an insulating part and a wiring pattern part.

The second elastic member 650 enables movement (tilt, shift, and rotation) of the image sensor module 660, while also enabling signal transmission.

The second elastic member 650 may be disposed between the image sensor module 660 and the first substrate 510. Preferably, the second elastic member 650 may be disposed between the wire part 700 connected to the first substrate 510 and the image sensor module 660. At least a part of the second elastic member 650 may have elasticity.

In addition, the image sensor module 600 may be electrically connected to the second elastic member 650 while being elastically supported by the second elastic member 650. In this case, the image sensor module 660 may move relative to the lens module 100 or the first substrate 510 by the elastic force of the second elastic member 650 and the interaction between the magnet part 630a and the second coil part 635.

The second elastic member 650 may include an insulating part composed of an inner frame and an outer frame, and an elastic pattern part disposed on the insulating part. In this case, as described above, the insulating part composed of the inner frame and the outer frame may be selectively omitted.

The second elastic member 650 includes an insulating part 651 and a second lead pattern part 652 disposed on one surface of the insulating part 651. At this time, although the drawing shows that the pattern part 652 is disposed on a lower surface of the insulating part 651, the embodiment is not limited thereto. For example, the second lead pattern part 652 may be disposed on an upper surface of the insulating part 651.

The insulating part 651 may be divided into a plurality of regions separated from each other.

For example, the insulating part 651 includes a first insulating part 651-1 having an opening formed in a center thereof. In addition, the insulating part 651 may include a second insulating part 651-2 disposed outside the first insulating part 651-1 and spaced apart from the first insulating part 651-1. At this time, although it is illustrated that the first insulating part 651-1 and the second insulating part 651-2 are separated from each other in the drawing, the embodiment is not limited thereto. For example, a connection insulating part (not shown) may be further disposed between an outside of the first insulating part 651-1 and an inside of the second insulating part 651-2. In other words, the first insulating part 651-1 and the second insulating part 651-2 of the insulating part 651 may have a structure physically completely separated from each other with an open region interposed therebetween. Also, differently from this, the first insulating part 651-1 and the second insulating part 651-2 of the insulating part 651 may be connected to each other in some regions through the connection insulating part disposed in the open region. That is, the insulating part is not completely removed in the region between the first insulating part 651-1 and the second insulating part 651-2, but a part remains. In addition, the part remaining without being removed may function as a connection insulating part connecting the first insulating part 651-1 and the second insulating part 651-2. The connection insulating part may provide an elastic force in the moving operation of the image sensor module 660. In addition, the connection insulating part may inhibit detachment between the first insulating part 651-1 and the second insulating part 651-2 during the movement process. In this case, the insulating part 651 may be formed on one insulating member by removing a region corresponding to the open region through etching or physical punching.

However, it is important here that the insulating part 651 in the embodiment includes an open region formed between the first insulating part 651-1 and the second insulating part 651-2, and the first insulating part 651-1 and the second insulating part 651-2 may be separated from each other without being connected to each other in the open region.

That is, the second insulating part 651-2 may be spaced apart from the first insulating part 651-1 through the open region by a predetermined interval, and disposed to surround the first insulating part 651-1 at the spaced apart position. In this case, the first insulating part 651-1 and the second insulating part 651-2 may have a single layer structure disposed on the same plane.

The insulating part 651 may have a thickness of 20 μm to 100 μm. For example, the insulating part 651 may have a thickness of 25 μm to 50 μm. For example, the insulating part 651 may have a thickness of 30 μm to 40 μm. If the thickness of the insulating part 651 exceeds 100 μm, the thickness of the second elastic member 650 may increase. If the thickness of the insulating part 651 is less than 20 the second lead pattern part 652 may not be stably supported. For example, if the thickness of the insulating part 651 is less than 20 it may be vulnerable to heat/pressure in a soldering process for coupling with the image sensor module 660. And, thereby, the coupling force with the image sensor module 660 may be reduced.

Meanwhile, although not shown in the drawing, at least one slit (not shown) may be formed in the first insulating part 651-1. The slit may be formed to maintain the flatness of the first insulating part 651-1. The slit may maintain flatness while reducing the weight of the insulating part 651 and the second elastic member 650. Accordingly, the overall reliability of the camera module may be improved.

A second lead pattern part 652 is disposed on one surface of the insulating part 651. That is, the first lead pattern part 513 in the embodiment is formed on the first substrate 510. And, the second lead pattern part 652 in an embodiment may constitute the second elastic member 650. In addition, a second-first lead pattern part 652-1 corresponding to one end of the second lead pattern part 652 may be connected to the image sensor module 660. In addition, a second-second lead pattern part 652-2 corresponding to the other end of the second lead pattern part 652 may be connected to the second lead pattern part 513 of the first substrate 510 through the wire part 700.

The second lead pattern part 652 includes a second-first lead pattern part 652-1 disposed on the first insulating part 651-1 of the insulating part 651. The second lead pattern part 652 includes a second-second lead pattern part 652-2 disposed on the second insulating part 651-2. The second lead pattern part 652 includes a connection pattern part 652-3 disposed on an open region between the first insulating part 651-1 and the second insulating part 651-2. The connection pattern part 652-3 may electrically connect the second-first lead pattern part 652-1 and the second-second lead pattern part 652-2. In this case, the connection pattern part 652-3 may be disposed on an open region between the first insulating part 651-1 and the second insulating part 651-2. Preferably, the connection pattern part 652-3 may elastically support the image sensor module 660.

That is, the second lead pattern part 652 may include a plurality of elastic connection lines including the second-first lead pattern part 652-1, the second-second lead pattern part 652-2, and a connection pattern part 652-3.

Here, the first insulating part 651-1 of the insulating part 651 and the second-first lead pattern part 652-1 of the second lead pattern part 652 may form an inner frame of the second elastic member 650.

In addition, the second insulating part 651-2 of the insulating part 651 and the second-second lead pattern part 652-2 of the second lead pattern part 652 may form an outer frame of the second elastic member 650. Also, the connection pattern part 652-3 may form a connection part elastically connecting the outer frame and the inner frame of the second elastic member 650. The connection pattern part 652-3 may form a signal transmission path between the inner frame and the outer frame of the second elastic member 650.

The second-first lead pattern part 652-1 may be disposed on each of four side regions of the first insulating part 651-1. That is, the first insulating part 651-1 may include a left side region, a right side region, an upper side region, and a lower side region. In addition, the second-first lead pattern part 652-1 may be disposed adjacent to a corner region of the four side regions of the first insulating part 651-1. For example, the second-first lead pattern part 652-1 is disposed adjacent to a lower left corner on the left side region. For example, the second-first lead pattern part 652-1 is disposed adjacent to an upper right corner on the right side region. For example, the second-first lead pattern part 652-1 is disposed adjacent to the upper-left corner on the upper side region. For example, the second-first lead pattern part 652-1 may be disposed adjacent to a lower right corner on the lower side region.

The second-second lead pattern part 652-2 may be disposed on each of four side regions of the second insulating part 651-2. The second insulating part 651-2 may include a left side region, a right side region, an upper side region, and a lower side region. In addition, the second-second lead pattern part 652-2 may be disposed adjacent to a corner region of the four side regions of the second insulating part 651-2.

In this case, at least one of the second-first lead pattern parts 652-1 may be formed on a left side region (e.g., a first side region) of the first insulating part 651-1. In addition, the second-second lead pattern part 652-2 directly connected to the second-first lead pattern part 652-1 formed on the left side region may be formed on a second side region of the second insulating part 651-2 that does not correspond to the first side region, for example, a lower side region.

The second-first lead pattern part 652-1 and the second-second lead pattern part 652-2 have a rotational shape and may be disposed adjacent to different corner regions of the insulating part. This may improve reliability in the Z-roll process of the image sensor module 660.

Here, the second-first lead pattern part 652-1 may be an outer lead pattern part connected to the terminal part 661-1 of the image sensor module 660.

The second-first lead pattern part 652-1 and the second-second lead pattern part 652-2 may be connected to each other through the connection pattern part 652-3. One end of the connection pattern part 652-3 is connected to the second-first lead pattern part 652-1. The other end of the connection pattern part 652-3 is connected to the second-second lead pattern part 652-2. In addition, a region other than the one end and the other end of the connection pattern part 652-3 may be positioned on an open region between the first insulating part 651-1 and the second insulating part 651-2. That is, the connection pattern part 652-3 may be arranged on flying over the open region. Here, the flying means that the insulating part 651 does not exist on at least a part of the connection pattern part 652-3. For example, the flying means that at least a part of the connection pattern part 652-3 is disposed on the open region in a floating state without contacting the insulating part 651.

At this time, the second-first lead pattern part 652-1 is configured in plurality. Also, the second-second lead pattern parts 652-2 is configured in plurality. In addition, the connection pattern part 652-3 may connect between the plurality of second-first lead pattern parts 652-1 and the plurality of second-second lead pattern parts 652-2 in a 1:1 ratio.

In this case, a number of second-first lead patterns of the second-first lead pattern part 652-1 may be 28. In addition, a number of second-second lead patterns of the second-second lead pattern part 652-2 may be 28. In addition, a number of connection patterns of the connection pattern part 652-3 may be 28. Accordingly, the connection pattern part 652-3 may connect between the first lead patterns and the second lead patterns.

The connection pattern part 652-3 may be bent at least once on the open region and disposed. That is, the connection pattern part 652-3 may include at least one bent portion. The connection pattern part 652-3 may be disposed to have a structure in the form of rotation on the open region.

For example, when the second-first lead pattern part 652-1 and the second-second lead pattern part 652-2 are disposed to face each other on the insulating part 651, the connection pattern part 652-3 may connect the second-first lead pattern part 652-1 and the second-second lead pattern part 652-2 in a straight line without a bent portion.

Unlike this, the second-first lead pattern part 652-1 and the second-second lead pattern part 652-2 in the embodiment are not disposed to face each other based on the second lead pattern part directly connected to each other. Accordingly, the connection pattern part 652-3 includes a bent portion that is bent at least once. In addition, the bent portion of the connection pattern part 652-3 may improve the elasticity of the connection pattern part 652-3. Furthermore, the bent portion of the connection pattern part 652-3 may improve the rigidity of the connection pattern part 652-3.

In this case, a length of the connection pattern part 652-3 is greater than a width of the open region between the first insulating part 651-1 and the second insulating part 651-2.

The connection pattern part 652-3 may be formed by etching to have the shape as described above. Preferably, the second-first lead pattern part 652-1, the second-second lead pattern part 652-2 and the connection pattern part 652-3 are integrally formed with each other, and accordingly, it may be simultaneously formed by etching one metal layer.

On the other hand, a thickness of each of the second-first lead pattern part 652-1, the second-second lead pattern part 652-2, and the connection pattern part 652-3 (that is, a thickness of the second lead pattern part) may be 10 μm to 50 μm. For example, the thickness of the second lead pattern part 652 may be 30 μm to 40 μm.

In this case, if the thickness of the second lead pattern part 652 is less than 10 μm, the breakage of the second lead pattern part 652 may occur during the movement of the image sensor module 660. In addition, if the thickness of the second lead pattern part 652 is greater than 50 μm, the elastic force of the connection pattern part 652-3 may be lowered. Also, if the elastic force is lowered, mobility of the image sensor module 660 may be reduced. Accordingly, the thickness of the second lead pattern part 652 in the embodiment is 35 µm±5 µm to stably move the image sensor module 660.

A length of the connection pattern part 652-3 is greater than a width of an open region between the first insulating part 651-1 and the second insulating part 651-2. Here, the width of the open region may be a straight distance connecting the first insulating part 651-1 and the second insulating part 651-2 in a straight line.

The length of the connection pattern part 652-3 is at least 1.5 times the linear distance. In addition, the length of the connection pattern part 652-3 is set to be 20 times or less of the linear distance.

At this time, if the length of the connection pattern part 652-3 is less than 1.5 times the linear distance, the shift operation of the image sensor module 660 due to a decrease in the elastic force of the connection pattern part 652-3 may be affected. In addition, if the length of the connection pattern part 652-3 is greater than 20 times the linear distance, resistance may increase as the signal transmission distance by the connection pattern part 652-3 increases. In addition, if the resistance increases, noise may be included in the signal transmitted through the connection pattern part 652-3. Accordingly, the length of the connection pattern part 652-3 is set to be less than or equal to 10 times the linear distance between the second-first lead pattern part 652-1 and the second-second lead pattern part 652-2.

Meanwhile, the second lead pattern part 652 as described above is a wire that transmits an electrical signal, and may be formed of a metal material having high electrical conductivity. To this end, the second lead pattern part 652 may be formed of at least one metallic material selected from among gold (Au), silver (Ag), platinum (Pt), titanium (Ti), tin (Sn), copper (Cu), and zinc (Zn). In addition, the second lead pattern part 652 may be formed of a paste or solder paste including at least one metal material selected from Gold (Au), silver (Ag), platinum (Pt), titanium (Ti), tin (Sn), copper (Cu), and zinc (Zn).

Preferably, the second lead pattern part 652 may be formed of a metal material having an elastic force to enable movement of the image sensor module 660 while serving as a wiring. To this end, the second lead pattern part 652 may be formed of a metal material having a tensile strength of 1000 MPa or more. For example, the second lead pattern part 652 may be a binary alloy or a ternary alloy including copper. For example, the second lead pattern part 652 may be a binary alloy of copper (Cu)-nickel (Ni). For example, the second lead pattern part 652 may be a binary alloy of copper (Cu)-tin (Sn). For example, the second lead pattern part 652 may be a binary alloy of copper (Cu)-beryllium (Be). For example, the second lead pattern part 652 may be a binary alloy of copper (Cu)-cobalt (Co). For example, the second lead pattern part 652 may be a ternary alloy of copper (Cu)-nickel (Ni)-tin (Sn). For example, the second lead pattern part 652 may be a ternary alloy of copper (Cu)-beryllium (Be)-cobalt (Co). In addition to the metal material, the second lead pattern part 652 may be formed of an alloy such as iron (Fe), nickel (Ni), zinc, etc., which has good electrical properties while having an elastic force that can act as a spring. Also, the second lead pattern part 652 may be surface-treated with a plating layer including a metal material such as gold (Au), silver (Ag), or palladium (Pd). Thereby, electrical conductivity can be improved.

Meanwhile, a line width of the second-first lead pattern part 652-1 may be the same as a line width of the second-second lead pattern part 652-2.

Also, the line width of the connection pattern part 652-3 may be smaller than the line widths of the second-first lead pattern part 652-1 and the second-second lead pattern part 652-2.

At this time, a buffer portion having a rounded side surface as the width gradually decreases is between the second-first lead pattern part 652-1 and the connection pattern part 652-3 and between the second-second lead pattern part 652-2 and the connection pattern part 652-3.

That is, side surfaces of both ends of the connection pattern part 652-3 may have a curvature. In this case, when the side surfaces of both ends of the connection pattern part 652-3 have a linear shape, stress may be concentrated in this part. And, when the stress is concentrated, a breakage phenomenon in which the connection pattern part 652-3 is separated from the second-first lead pattern part 652-1 or the second-second lead pattern part 652-2 may occur.

Accordingly, the side surface of the end of the connection pattern part 652-3 has a rounded shape. Through this, it is possible to inhibit the concentration of stress at the end.

In this case, the curvature (R) value of the side surface of the end of the connection pattern part 652-3 may have a value between 30 and 100. When the curvature (R) value of the side surface is less than 30, the stress concentration prevention effect may be insignificant. When the value of the curvature R of the side surface is greater than 100, the elastic force of the connection pattern part 652-3 may be reduced.

Here, the line width of the connection pattern part 652-3 may be 20 to 1000 When the line width of the connection pattern part 652-3 is less than 20 the overall rigidity of the connection pattern part 652-3 may decrease. In addition, when the line width of the connection pattern part 652-3 is greater than 1000 the elastic force of the connection pattern part 652-3 may decrease, and the mobility of the image sensor module 660 may be reduced.

Meanwhile, the second-first lead pattern part 652-1 in the first embodiment of FIG. 15 may be disposed only on the first insulating part 651-1 of the insulating part 651. Alternatively, the second-first lead pattern part 652-1a in the second embodiment of FIG. 16 includes a first part disposed on the first insulating part 651-1, and a second part extending from the first part and protruding inward of the first insulating part 651-1. For example, the second part may overlap the central opening of the first insulating part 651-1 in a vertical direction or an optical axis direction. A second part of the second-first lead pattern part 652-1 is disposed to protrude inward from the first insulating part 651-1. Accordingly, it is possible to provide the ease of the soldering process performed for coupling with the terminal part 641-1 of the image sensor module 660 according to the embodiment.

In addition, the second-second lead pattern part 652-2 includes a first part 652-21 disposed on the second insulating part 651-2 of the insulating part 651. In addition, the second-second lead pattern part 652-2 may include a second part 652-22 and a third part 652-23 extending from the first part 652-21 and protruding outward of the first insulating part 651-2. The second part 652-22 and the third part 652-23 may protrude outward from the second insulating part 651-2. Accordingly, the embodiment may provide the ease of a soldering process performed for coupling with the wire part 700.

Specifically, the second-second lead pattern part 652-2 includes a first part 652-21 disposed on the insulating part

651, a third part 652-23 coupled to the wire part 700, and a second part 652-22 connecting the first part 652-21 and the third part 652-23. In addition, one end of the first part 652-21 of the second-second lead pattern part 652-2 may be connected to the connection pattern part 652-3.

Here, the first part 652-21 may be referred to as a body part of the second-second lead pattern part 652-2. That is, the first part 652-21 may be a body part of the second-second lead pattern part 652-2 disposed on the insulating part and supporting the other part thereof. In addition, the third part 652-23 may be referred to as a coupling part coupled to the wire part 700. Also, the second part 652-22 may be a connection part connecting the first part 652-21 and the third part 652-23.

A hole through which the wire part 700 passes may be formed in the third part 652-23. The third part 652-23 may be coupled to the wire part 700 by soldering. The second part 652-22 may include a bent portion. The second part 652-22 may be bent a plurality of times in one direction. The second part 652-22 may have elasticity. Accordingly, the second-second lead pattern part 652-2 may have elasticity.

In this case, when the second part 652-22 does not include the bent portion, the wire part 700 may move together when the image sensor module 660 moves, so that bending may occur. Also, breakage may occur depending on the degree of occurrence of the warpage. Alternatively, the second part 652-22 in the embodiment includes a bent portion. Accordingly, when the image sensor module 660 moves, it may serve as a suspender. Accordingly, the rigidity of the wire part 700 in the embodiment may be increased by providing elasticity to the wire part 700.

The third part 652-23 may be a bonding pad electrically connected to the wire part 700. That is, the third part 652-23 may be a soldering pad that is soldered to the wire part 700. To this end, the third part 652-23 may include a hole through which the wire part 700 passes.

The second part 652-22 may connect the first part 652-21 and the third part 652-23. To this end, the second part 652-22 may include a plurality of bent portions. For example, the second part 652-22 may include a bent portion rotating in a clockwise direction. That is, the second part 652-22 may be bent in a direction corresponding to the rotation direction of the image sensor module. Accordingly, when the image sensor module rotates about the z-axis, the second part 652-22 may minimize damage applied to the second-second lead pattern part 652-2. Through this, cracks occurring in the second-second lead pattern part 652-2 in the embodiment may be inhibited. Furthermore, the embodiment may inhibit the second-second lead pattern part 652-2 from being separated from the insulating part 651. Meanwhile, the embodiment may include an adhesive member (not shown) disposed between the insulating part 651 and the second-second lead pattern part 652-2. The adhesive member may be interposed between the insulating part 651 and the second-second lead pattern part 652-2 in order to inhibit the second-second lead pattern part 652-2 from being separated from the insulating part 651. The adhesive member may include an adhesive for curing. In addition, the adhesive member may be electrolytically plated to increase adhesion to the second-second lead pattern part 652-2, and thus roughness may be imparted to the surface.

Meanwhile, the second-second lead pattern part 652-2 may have different line widths for each part. The first part 652-21 may have a wider width than other parts to increase adhesion with the insulating part 651. In addition, the second part 652-22 may have a narrower line width than the first part 652-21 to have an elastic force. In this case, the second part 652-22 may have a line width of 20 to 1000 μm. When the line width of the second part 652-22 is less than 20 μm, the overall rigidity of the second-second lead pattern part 652-2 may be reduced, and accordingly, the reliability of the second-second lead pattern part 652-2 may be reduced. And, when the line width of the second part 652-22 is greater than 1000 μm, the elastic force of the second-second lead pattern part 652-2 is reduced, and accordingly, a problem may occur in the shift of the image sensor module 660.

Meanwhile, the buffer pattern part may be formed on the second part 652-22 to serve as a buffer in the region A connected to the first part 652-21. The buffer pattern part may have a shape in which a width gradually decreases in a direction from the first part 652-21 to the second part 652-22. In this case, the decrease in the width may have a non-linear characteristic rather than a linear one. Accordingly, the outer surface of the buffer pattern part may have a rounded shape.

Meanwhile, the buffer pattern part can solve problems such as pattern breakage caused by the pattern width difference between the first part 652-21 and the second part 652-22. That is, the buffer pattern part may stably connect between the first part 652-21 and the third part 652-23.

Also, the buffer pattern part may not overlap the insulating layer in a vertical direction. When the substrate is tilted, a point where the connection part and the pattern part are connected does not exist on the insulating layer, but may exist outside the insulating layer. Accordingly, the embodiment can effectively reduce pattern breakage caused by a difference in width between the connection part and the pattern part.

Meanwhile, the second part 652-22 may be bent at least once as described above. Accordingly, the second part 652-22 includes a second-first part 652-22a extending in one direction, and a second part 652-22b extending in a direction different from the one direction.

In this case, the side surface of the second-second part 652-22b may have a rounded shape rather than a straight line. That is, when the side surface of the second-second part 652-22b has a linear shape, stress may be concentrated in this part, and thus the second-second lead pattern part 652-2 may be broken. Accordingly, the side surfaces of the second-second part 652-22b have a rounded shape to inhibit stress from being concentrated in the second-second part 652-22b. In this case, the value of the curvature R of the side surface of the second-second part 652-22b is set to be between 30 and 100. When the curvature (R) value of the side surface is less than 30, the stress concentration prevention effect may be insignificant. When the value of the curvature R of the side surface is greater than 100, the elastic force of the second-second lead pattern part 652-2 may be reduced. In this case, the second-second part 652-22b may include an inner surface and an outer surface according to the bending direction. In addition, a value of the curvature R of the inner surface of the second-second part 652-22b may be different from a value of the curvature R of the outer surface of the second-second part 652-22b. Through this, the embodiment allows the stress relaxation effect to be maximized.

In addition, the second-second part 652-22b may have a different line width than the second-first part 652-22a. For example, the second-second part 652-22b may have a line width greater than that of the second-first part 652-22a. Through this, the embodiment can inhibit the stress from being concentrated in the second-second part 652-22b.

Meanwhile, although it has been described that the second part 652-22 of the second-second lead pattern part 652-2 has a rectangular shape with rounded corners, the embodiment is not limited thereto. For example, the second part 652-22 of the second-second lead pattern part 652-2 may have a circular shape or a polygonal shape and may be bent.

With the above structure, the image sensor module 660 may be disposed at a location spaced apart from the first substrate 510 by a predetermined distance while being elastically supported through the wire part 700. In addition, the image sensor module 660 may be elastically supported by elastic members disposed at upper and lower sides. In this case, the second elastic member 650 disposed below the image sensor module 660 may include the second-first lead pattern part 652-1 connected to the image sensor module 660, the second-second lead pattern part connected to the wire part, and a connection pattern part 652-3 connecting them. In addition, at least two of the second lead patterns constituting the second lead pattern part 652 are electrically connected to the second coil part 635. Accordingly, a forward current or a reverse current may be provided to the second coil part 635.

Meanwhile, the image sensor module 660 may include a sensor substrate 661, an image sensor 662, a sensor base 663, and a filter 664.

As such, the image sensor module 660 includes a sensor base 663.

The sensor base 663 includes an opening 663-1. In addition, the sensor base 663 may include a step 663-2 adjacent to the opening 663-1 on which the filter 664 can be mounted. An adhesive member (not shown) may be disposed on the step 663-2. A filter 664 may be fixedly disposed on the adhesive member. The filter 664 may serve to block light of a specific frequency band from being incident on the image sensor 662 in light passing through the lens module 100. The filter 664 may be disposed parallel to the x-y plane. The filter 664 may be disposed between the lens module 100 and the image sensor 662. The filter 664 may include an infrared filter. The infrared filter may absorb or reflect infrared ray incident to the infrared filter.

The sensor substrate 661 may be a package substrate. That is, the image sensor 662 may be mounted on the sensor substrate 661 in the form of a package. The sensor substrate 661 may include a printed circuit board (PCB). The sensor substrate 661 may include a circuit board. An image sensor 662 may be disposed on the sensor substrate 661. The sensor substrate 661 may be coupled to the second elastic member 650. To this end, a terminal part 641-1 electrically connected to the second-first lead pattern part 652-1 of the second elastic member 650 may be provided on the lower surface of the sensor substrate 661.

Meanwhile, the sensor substrate 661 may be disposed in the opening of the third holder 620. Accordingly, the terminal part 641-1 may be electrically connected through soldering or the like in a state in which it is aligned with the second-first lead pattern part 652-1 of the second elastic member 650.

The image sensor 662 may have a configuration in which light passing through the lens module 100 and the filter 664 is incident to form an image. The image sensor 662 may be mounted on the sensor substrate 661. The image sensor 662 may be electrically connected to the sensor substrate 661. For example, the image sensor 662 may be coupled to the sensor substrate 661 by a surface mounting technology (SMT). As another example, the image sensor 662 may be coupled to the sensor substrate 661 by flip chip technology. The optical axis of the image sensor 662 may be arranged to coincide with the optical axis of the lens module 100. That is, the optical axis of the image sensor 662 and the optical axis of the lens module 100 may be aligned. The image sensor 662 may convert light irradiated to the effective image region of the image sensor 662 into an electrical signal. In addition, the converted electrical signal may be an image signal. The image sensor 662 may be any one of a charge coupled device (CCD), a metal oxide semi-conductor (MOS), a CPD, and a CID.

<Image Sensor Module Shift Driving Operation>

Hereinafter, a shift operation of the image sensor module 660 will be described.

Figure 22:
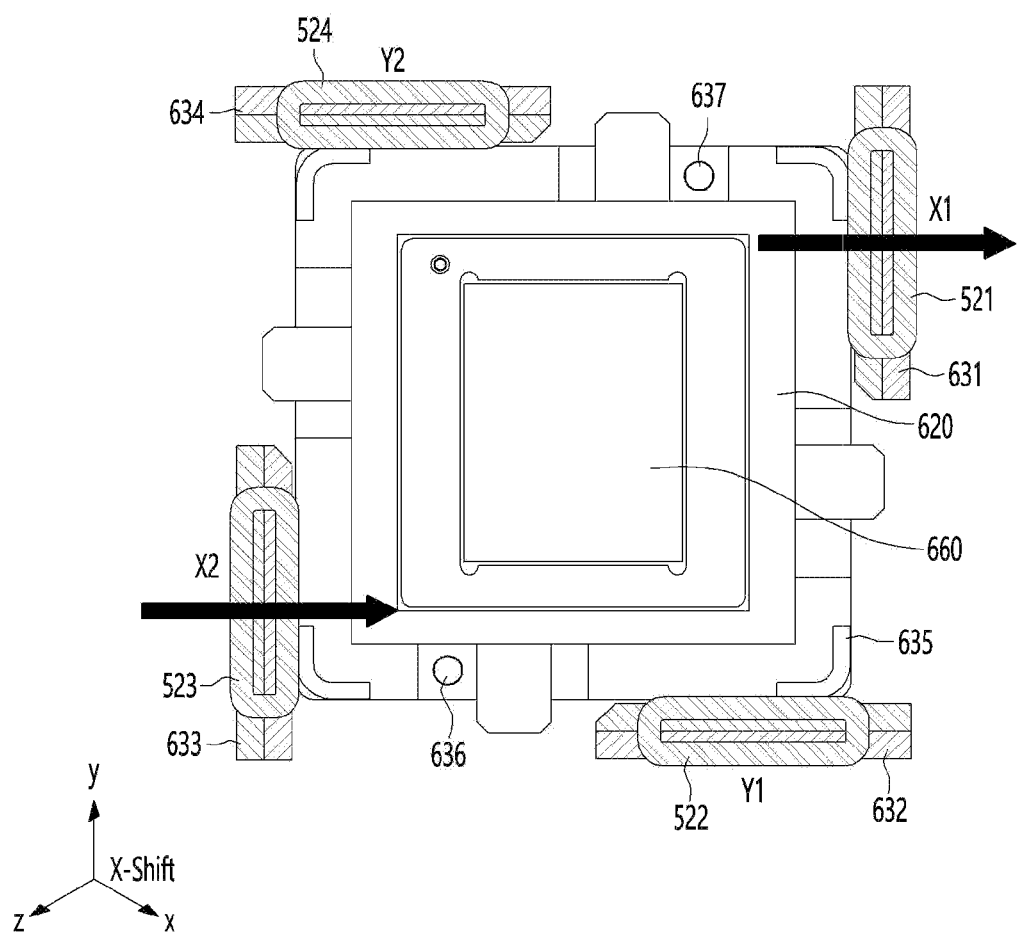
FIG. 22 is a view for explaining x-axis direction shift driving through some configurations of the sensor driving device according to the embodiment.
Figure 23:
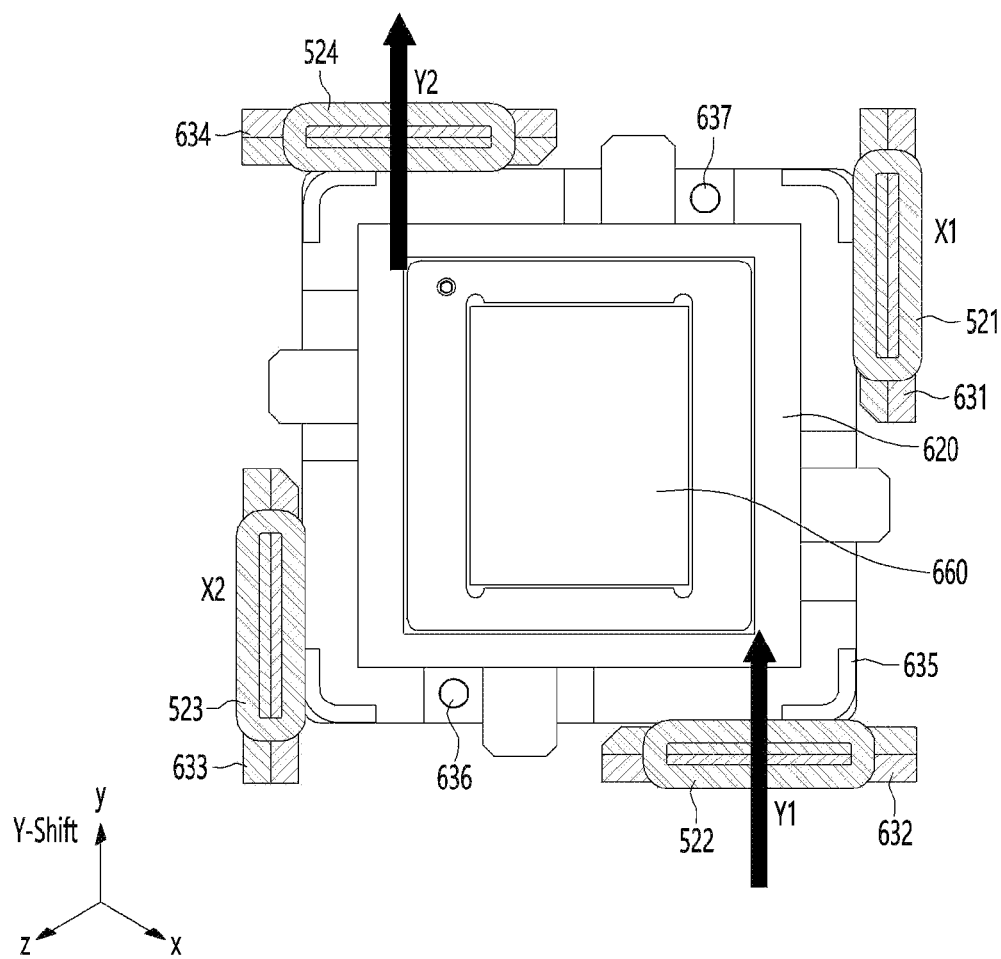
FIG. 23 is a view for explaining y-axis direction shift driving through some configurations of the sensor driving device according to the embodiment.
Figure 24:
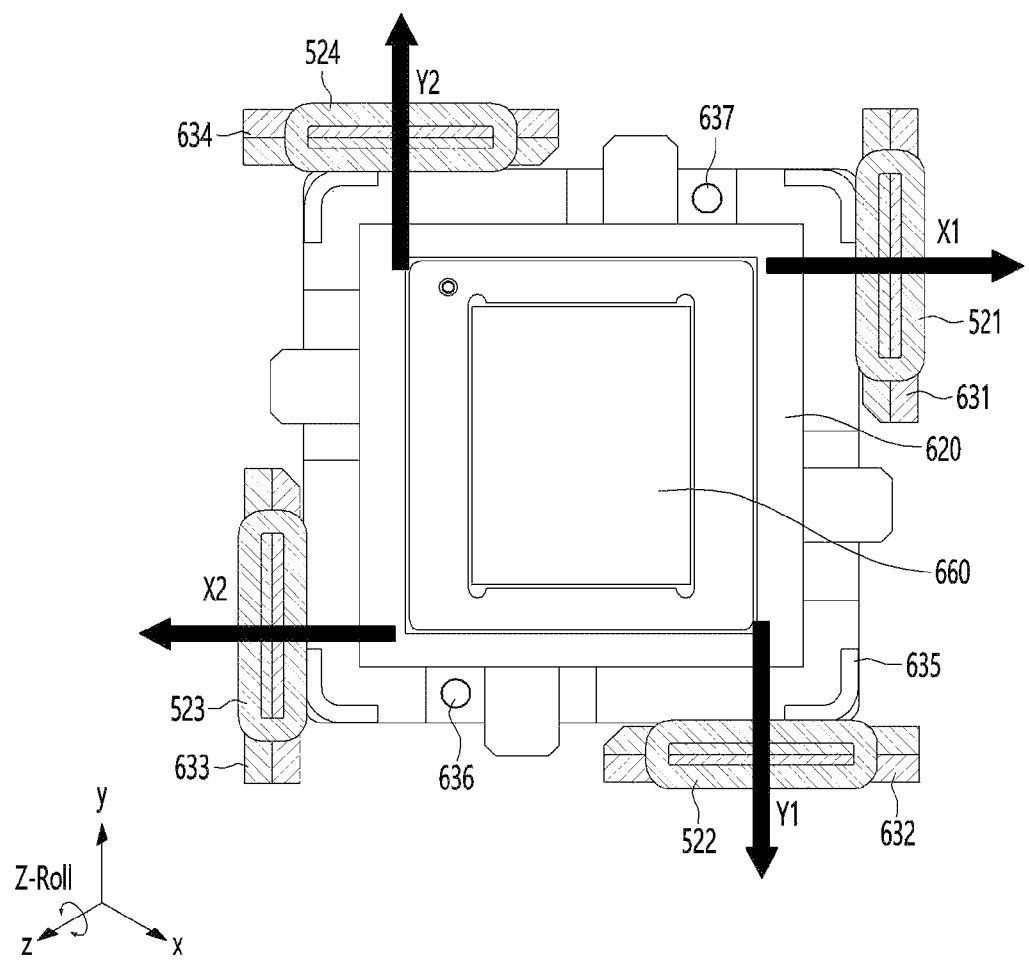
FIG. 24 is a view for explaining z-axis rotational driving through some configurations of the camera device according to the embodiment.

FIG. 22 is a view for explaining x-axis direction shift driving through some configurations of the sensor driving device according to the embodiment, FIG. 23 is a view for explaining y-axis direction shift driving through some configurations of the sensor driving device according to the embodiment, and FIG. 24 is a view for explaining z-axis rotational driving through some configurations of the camera device according to the embodiment.

Firstly, an OIS operation of the actuator 400, which is a sensor driving device according to an embodiment, will be described with reference to FIGS. 22 to 24.

As shown in FIG. 22, currents in the same direction may be applied to the first-first coil 521 and the first-third coil 523. Accordingly, the image sensor 662 coupled to the image sensor module 660 may be moved (shifted) in the x-axis direction through electromagnetic interaction between the first magnet 631 and the third magnet 633. That is, the first-first coil 521 and the first magnet 631, and the first-third coil 523 and the third magnet 633 may be used to shift the image sensor 662 in the x-axis direction. At this time, the first-first coil 521 and the first magnet 631 may be a first x-axis shift driving part X1, and the first-third coil 523 and the third magnet 633 may be a second x-axis shift driving part X2.

As shown in FIG. 23, currents in the same direction may be applied to the first-second coil 522 and the first-fourth coil 524. Through this, the image sensor 662 coupled to the image sensor module 660 may be moved (shifted) in the y-axis direction through electromagnetic interaction with the second magnet 632 and the fourth magnet 634. That is, the first-second coil 522, the second magnet 632, the first-fourth coil 524, and the fourth magnet 634 may be used to shift the image sensor 662 in the y-axis direction. At this time, the first-second coil 522 and the second magnet 632 may be a first y-axis shift driving part Y1, and the first-fourth coil 524 and the fourth magnet 634 may be a second y-axis shift driving part Y2.

As shown in FIG. 24, currents in opposite directions may be applied to the first-first coil 521 and the first-third coil 523. In addition, currents in opposite directions may be applied to the first-second coil 522 and the fourth coil 524. At this time, if the rotation direction of the magnet part 630*a* is the same by the current applied to the first-first coil 521 and the current applied to the second coil 522, the image sensor 662 coupled to the image sensor module 660 may rotate (roll, rolling) about the z-axis. The embodiment shown in FIG. 24 illustrates a case in which the first coil part 520 is controlled by four control channels. And, when the first coil part 520 is controlled by three control channels, the image sensor 662 may be rolled by the first-first coil 521 and the first-third coil 523 or the first-second coil 522 and the first-fourth.

On the other hand, an AF operation of the actuator 400 may be performed by moving the image sensor 662 coupled to the image sensor module 660 in the z-axis direction by the electromagnetic interaction of the magnet part 630*a* and the second coil part 635. For example, when a forward current is supplied to the second coil part 635, the image sensor 662 coupled to the image sensor module 660 may move in a +z (or upper side) direction closer to the first substrate 510. For example, when a reverse current is supplied to the second coil part 635, the image sensor 662 coupled to the image sensor module 660 may move in a −z (or lower side). Direction away from the first substrate 510.

<Optical Device>

Hereinafter, an optical device according to the present embodiment will be described with reference to the drawings.

Figure 25:
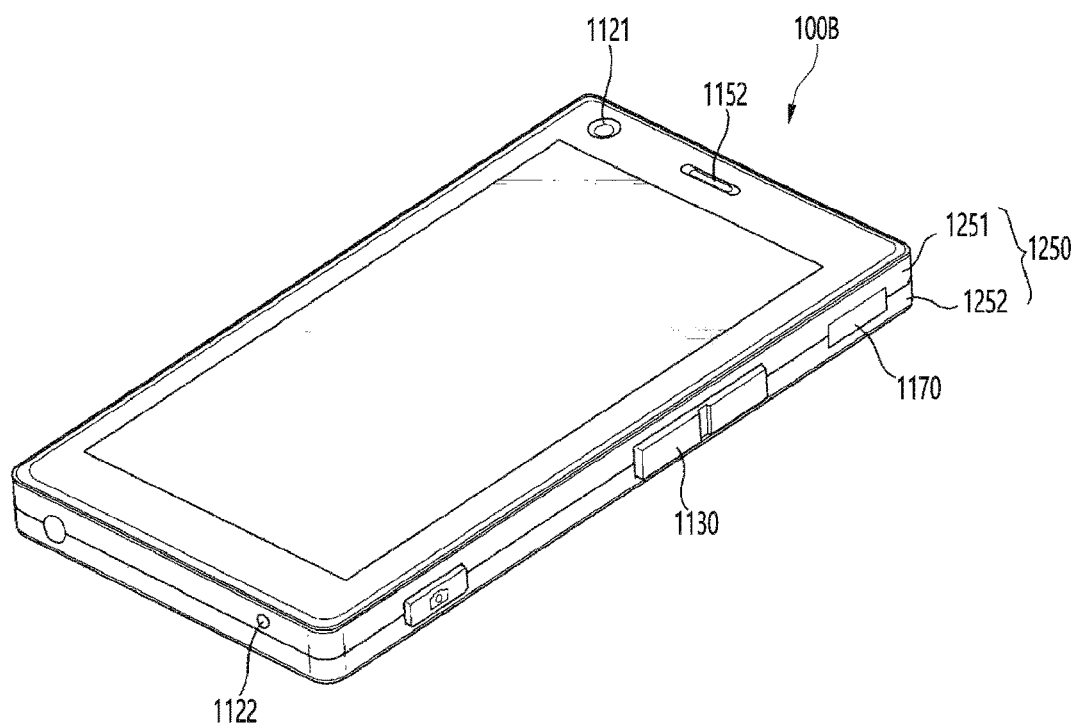
FIG. 25 is a perspective view of an optical device according to the embodiment.
Figure 26:
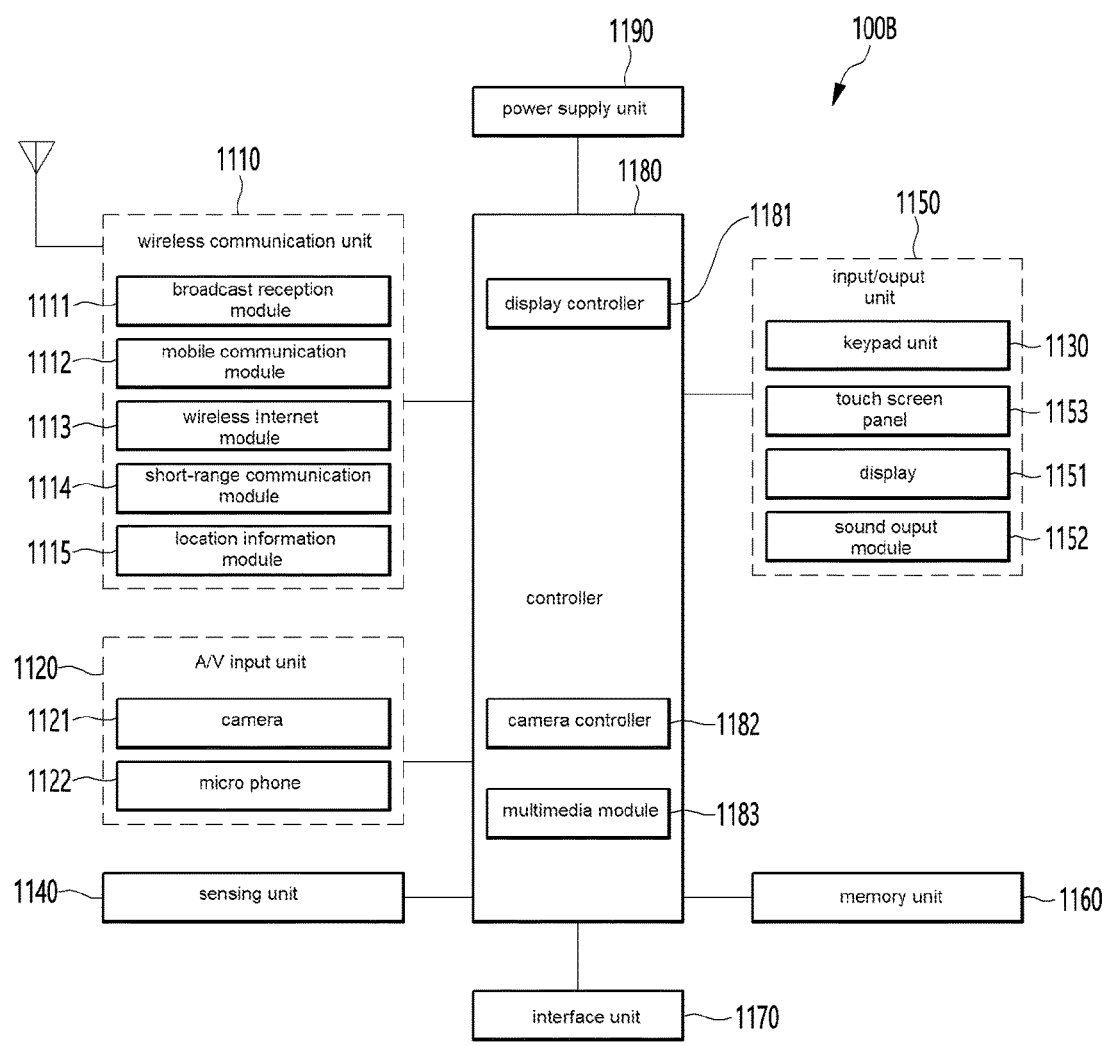
FIG. 26 is a block diagram of the optical device shown in FIG. 25.

FIG. 25 is a perspective view of an optical device according to the present embodiment, and FIG. 26 is a block diagram of the optical device shown in FIG. 25.

The optical device may be any one of a cell phone, a mobile phone, a smart phone, a portable smart device, a digital camera, a laptop computer, a digital broadcasting terminal, a PDA (Personal Digital Assistants), a PMP (Portable Multimedia Player), and a navigation device. However, the type of optical device is not limited thereto, and any device for taking an image or photo may be included in the optical device.

The optical device may include a body 1250. The body 1250 may have a bar shape. Alternatively, the body 1250 may have various structures such as a slide type, a folder type, a swing type, a swivel type, in which two or more sub-bodies are coupled to be movable relative to each other. The body 1250 may include a case (casing, housing, or cover) forming an exterior. For example, the body 1250 may include a front case 1251 and a rear case 1252. Various electronic components of an optical device may be embedded in a space formed between the front case 1251 and the rear case 1252. A display 1151 may be disposed on one surface of the body 1250. A camera 1121 may be disposed on one or more surfaces of one surface of the body 1250 and the other surface disposed opposite to the one surface.

The optical device may include a wireless communication unit 1110. The wireless communication unit 1110 may include one or more modules that enable wireless communication between the optical device and the wireless communication system or between the optical device and a network in which the optical device is located. For example, the wireless communication unit 1110 may include any one or more of a broadcast reception module 1111, a mobile communication module 1112, a wireless Internet module 1113, a short-range communication module 1114, and a location information module 1115.

The optical device may include an A/V input unit 1120. The A/V (Audio/Video) input unit 1120 is for inputting an audio signal or a video signal, and may include any one or more of a camera 1121 and a microphone 1122. In this case, the camera 1121 may include the camera device according to the present embodiment.

The optical device may include a sensing unit 1140. The sensing unit 1140 may detect a current state of the optical device, such as open/close status of optical device, position of optical device, presence of user contact, bearing of optical device, acceleration/deceleration of optical device, and generate a sensing signal for controlling the operation of the optical device. For example, when the optical device is in the form of a slide phone, it is possible to sense whether the slide phone is opened or closed. In addition, it may be responsible for sensing functions related to whether the power supply unit 1190 supplies power, whether the interface unit 1170 is coupled to an external device, and the like.

The optical device may include an input/output unit 1150. The input/output unit 1150 may be configured to generate an input or output related to visual, auditory, or tactile sense.

The input/output unit 1150 may generate input data for controlling the operation of the optical device, and may output information processed by the optical device.

The input/output unit 1150 may include any one or more of a keypad unit 1130, a display 1151, a sound output module 1152, and a touch screen panel 1153. The keypad unit 1130 may generate input data in response to a keypad input. The display 1151 may output an image captured by the camera 1121. The display 1151 may include a plurality of pixels whose color changes according to an electrical signal. For example, the display 1151 may include at least one of a liquid crystal display, a thin film transistor-liquid crystal display, an organic light-emitting diode, a flexible display, or a three-dimensional display (3D display). The sound output module 1152 may output audio data received from the wireless communication unit 1110 in a call signal reception, a call mode, a recording mode, a voice recognition mode, or a broadcast reception mode, or audio data stored in the memory unit 1160. The touch screen panel 1153 may convert a change in capacitance generated due to a user's touch on a specific region of the touch screen into an electrical input signal.

The optical device may include a memory unit 1160. A program for processing and control of the controller 1180 may be stored in the memory unit 1160. Also, the memory unit 1160 may store input/output data, for example, any one or more of a phone book, a message, an audio, a still image, a photo, and a moving image. The memory unit 1160 may store an image captured by the camera 1121, for example, a photo or a video.

The optical device may include an interface unit 1170. The interface unit 1170 serves as a passage for connecting to an external device connected to the optical device. The interface unit 1170 may receive data from an external device, receive power and transmit it to each component inside the optical device, or transmit data inside the optical device to the external device. The interface unit 1170 may include any one or more of a wired/wireless headset port, an external charger port, a wired/wireless data port, a memory card port, a port for connecting a device having an identification module, and an audio I/O (Input/Output), a video input/output (I/O) port, and an earphone port.

The optical device may include a controller 1180. The controller 1180 may control the overall operation of the optical device. The controller 1180 may perform related control and processing for voice call, data communication, video call, and the like. The controller 1180 may include a multimedia module 1181 for playing multimedia. The multimedia module 1181 may be provided within the controller 1180 or may be provided separately from the controller 1180. The controller 1180 may perform a pattern recognition process capable of recognizing a handwriting input or a drawing input performed on the touch screen as characters and images, respectively.

The optical device may include a power supply unit 1190. The power supply unit 1190 may receive external power or internal power under the control of the controller 1180 to supply power required for operation of each component.

According to an embodiment, the image sensor is moved and rotated respect to the lens barrel in the X-axis, Y-axis and Z-axis directions in order to implement the OIS and AF functions of the camera module instead of moving the lens barrel in the prior art. Accordingly, the camera module according to the embodiment can eliminate the complex spring structure for implementing the OIS and AF functions, and accordingly, the structure may be simplified. In addition, the embodiment may provide a more stable structure compared to the prior art, by moving the image sensor relative to the lens barrel.

In addition, the camera module according to the embodiment includes a lead pattern part electrically connected to the image sensor. The lead pattern part has a spring structure. In addition, the lead pattern part is disposed to float in a position that does not overlap with an insulating layer in a vertical direction. Accordingly, the camera module may stably and elastically support the image sensor. Also, the camera module may stably move the image sensor with respect to the lens barrel.

In addition, the X-axis direction shift, Y-axis direction shift, Z-axis direction shift, and Z-axis rotation of the image sensor in the camera module according to the embodiment may be performed for a handshake correction function. Furthermore, the camera module according to the embodiment may provide a handshake correction function through movement of the lens along with movement of the image sensor. Accordingly, the embodiment may provide a more improved handshake correction function.

In addition, the actuator for moving the image sensor relative to the lens barrel in the camera module in the embodiment includes an inner space. In addition, a gyro sensor, a driver IC, etc., which are electrical elements necessary for a camera circuit, may be built in the inner space of the actuator. Accordingly, the embodiment may reduce the overall height of the camera module.

In addition, the camera assembly process according to the embodiment can be simplified by integrating and fusing the camera circuit component and the actuator component.

In addition, the embodiment may enable easy replacement of the lens module.

That is, an OIS function or an AF function in the camera device in the comparative example should be provided in the lens module. Accordingly, when the lens module in the comparative example is replaced, the actuator must also be replaced. In addition, the AF function or the OIS function could not be provided in the case of replacing the lens module without an actuator for the AF function or the OIS function in the comparative example.

On the other hand, both the AF function and the OIS function in the embodiment can be implemented through the movement of the image sensor. Accordingly, when the lens module in the embodiment is replaced, it is possible to easily replace the lens module with a lens module not equipped with an OIS function, thereby improving user satisfaction.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

What is claimed is:

1. A sensor driving device comprising:
a fixed part including a first lead pattern part;
a moving part spaced apart from the fixed part; and
a wire part disposed between the fixed part and the moving part,
wherein the moving part includes an elastic member, a sensor disposed on the elastic member, a magnet holder having an opening, and a magnet part disposed on the magnet holder,
wherein the elastic member includes:
an insulating part including a first insulating part and a second insulating part disposed outside the first insulating part and spaced apart from the first insulating part; and
a second lead pattern part disposed on the insulating part,
wherein the second lead pattern part includes:
a second-first lead pattern part disposed on the first insulating part;
a second-second lead pattern part disposed on the second insulating part; and
a connection pattern part provided in a separation space between the first insulating part and the second insulating part,
wherein one end of the wire part is connected to the first lead pattern part of the fixed part and an other end of the wire part is connected to the second-second lead pattern part to elastically support the moving part; and
wherein one end of the connection pattern part is connected to the second-first lead pattern part and an other end of the connection pattern part is connected to the second-second lead pattern part to elastically support the sensor disposed on the first insulating part.

2. The sensor driving device of claim 1, wherein the fixed part includes a first substrate on which the first lead pattern part is disposed, and
wherein the first substrate is electrically connected to the sensor through the wire part and the second lead pattern part.

3. The sensor driving device of claim 2, wherein the fixed part includes a first coil part disposed on the first substrate.

4. The sensor driving device of claim 3,
wherein the opening of the magnet holder is formed in a central region thereof, and
wherein the magnet part is disposed to correspond to the first coil part.

5. The sensor driving device of claim 4, wherein the moving part includes:
a coil holder having an opening formed in a central region and disposed in the opening of the magnet holder, and
a second coil part disposed on the coil holder and corresponding to the magnet part.

6. The sensor driving device of claim 5, wherein the first coil part is disposed on a lower surface of the first substrate to face an upper surface of the magnet part, and
wherein the second coil part is disposed on an outer surface of the coil holder to face an inner surface of the magnet part.

7. The sensor driving device of claim 5, wherein the wire part includes a plurality of wires,
wherein at least one of the plurality of wires is electrically connected to the second coil part.

8. The sensor driving device of claim 5, wherein the moving part includes:

a sensor substrate disposed in the opening of the coil holder, on which the sensor is mounted and a terminal part connected to the second-first lead pattern part is formed.

9. The sensor driving device of claim 2, wherein the second lead pattern part includes a plurality of elastic connection lines,
wherein at least one second-first lead pattern part of the plurality of elastic connection lines is disposed on a first side region of the first insulating part, and
wherein a second-second lead pattern part connected to the second-first lead pattern part disposed on the first side region is disposed on a second side region of the second insulating part that does not correspond to the first side region.

10. The sensor driving device of claim 9, wherein the connection pattern part is bent at least twice.

11. The sensor driving device of claim 1, wherein the second-second lead pattern part includes:
a body part;
a coupling part coupled to the other end of the wire part; and
a connection part connecting the body part and the coupling part.

12. The sensor driving device of claim 11, wherein the coupling part has a hole through which the wire part passes without overlapping the insulating part in the direction of the optical axis, and wherein the other end of the wire part is coupled to the hole of the second-second lead pattern part to elastically support the moving part at a position spaced apart from the fixed part in the optical axis direction.

13. The sensor driving device of claim 1, wherein the second-second lead pattern part overlaps the wire part in an optical axis direction and does not overlap the first insulating part and the second insulating part in the optical axis direction.

14. The sensor driving device of claim 13, wherein the second-first lead pattern part includes an overlapping portion overlapping the first insulating part in the optical axis direction; and a non-overlapping portion extending from the overlapping portion and not overlapping with the first insulating part in the optical axis direction.

15. The sensor driving device of claim 1, wherein the first lead pattern part includes a plurality of first lead patterns,
wherein the second lead pattern part includes a plurality of second lead patterns,
wherein the wire part includes a plurality of wires, and
wherein a number of the plurality of wires is equal to or less than a number of each of the plurality of first lead patterns and the plurality of second lead patterns.

16. A sensor driving device comprising:
a first substrate including a first lead pattern part;
an elastic member spaced apart from the first substrate in an optical axis direction;
a wire part connecting the first substrate and the elastic member;
a sensor disposed on the elastic member;
a first driving part disposed on the first substrate; and
a first holder disposed on the elastic member and including an opening corresponding to the sensor;
wherein the elastic member includes:
an insulating part including a first insulating part and a second insulating part disposed outside the first insulating part and spaced apart from the first insulating part; and
a second lead pattern part disposed on the first insulating part, the second insulating part, and a separation space between the first insulating part and the second insulating part,
wherein the wire part is connected to one end of the first lead pattern part and one end of the second lead pattern part, respectively, and elastically supports the elastic member with respect to the first substrate; and
wherein the second lead pattern part elastically supports the sensor disposed on the second insulating part with respect to the first insulating part.

17. The sensor driving device of claim 16, wherein the second lead pattern part includes:
a second-first lead pattern part disposed on the first insulating part;
a second-second lead pattern part disposed on the second insulating part; and
a connection pattern part provided in the separation space between the first insulating part and the second insulating part,
wherein one end of the wire part is connected to the first lead pattern part and an other end of the wire part is connected to the second-second lead pattern part to elastically support the elastic member; and
wherein one end of the connection pattern part is connected to the second-first lead pattern part and an other end of the connection pattern part is connected to the second-second lead pattern part to elastically support the sensor disposed on the first insulating part.

18. The sensor driving device of claim 17, comprising:
a second holder disposed on the elastic member and including an opening corresponding to the first holder;
a second driving disposed on the first holder; and
a third driving part disposed on the second holder.

19. The sensor driving device of claim 18, wherein the first driving part includes a first coil,
wherein the second driving part includes a magnet, and
wherein the third driving part includes a second coil.

20. The sensor driving device of claim 19, wherein a lower surface of the first coil is disposed to face an upper surface of the magnet, and
wherein an outer surface of the second coil is disposed to face an inner surface of the magnet.

* * * * *